United States Patent [19]
Maeda

[11] Patent Number: 6,149,364
[45] Date of Patent: Nov. 21, 2000

[54] COLLET AND FASTENER USING SAME

[76] Inventor: Yutaka Maeda, 1123-5, Oaza-kumanosho, Shikatsu-cho, Nishikasugai-gun, Aichi-ken, Japan

[21] Appl. No.: 09/180,363

[22] PCT Filed: Mar. 6, 1998

[86] PCT No.: PCT/JP98/00928

§ 371 Date: Nov. 6, 1998

§ 102(e) Date: Nov. 6, 1998

[87] PCT Pub. No.: WO98/39141

PCT Pub. Date: Sep. 11, 1998

[30] Foreign Application Priority Data

Mar. 7, 1997 [JP] Japan .................................. 9-070497

[51] Int. Cl.[7] .................................................. F16B 37/08
[52] U.S. Cl. ........................................... 411/432; 411/535
[58] Field of Search ................................. 411/432, 433, 411/535, 536, 14.5, 916, 917

[56] References Cited

U.S. PATENT DOCUMENTS

| | | | |
|---|---|---|---|
| 427,887 | 5/1890 | Muir | 411/535 |
| 4,010,669 | 3/1977 | Kloren | 411/536 |
| 4,637,170 | 1/1987 | Block . | |
| 4,941,790 | 7/1990 | Kirn | 411/432 |
| 5,364,214 | 11/1994 | Fazekas | 411/536 |
| 5,388,942 | 2/1995 | Bonacina | 411/432 |

FOREIGN PATENT DOCUMENTS

| | | | |
|---|---|---|---|
| 163837 | 8/1949 | Austria | 411/535 |
| 53-51835 | 12/1978 | Japan . | |
| 63-22205 | 1/1988 | Japan . | |
| 2-502359 | 8/1990 | Japan . | |
| 7-299743 | 11/1995 | Japan . | |
| 2611237 | 9/1977 | United Kingdom | 411/535 |

*Primary Examiner*—Flemming Saether
*Attorney, Agent, or Firm*—Ladas & Parry

[57] ABSTRACT

A fastening device is provided with a radially contractible and expandable wedge-shaped collet (5) having a V-shaped section and a tapered outer circumference (5c), and supported on the opposite support surfaces (2c, 63b) of a fastening nut (2) and a fastening ring (63). A taper ring (60) is fitted on the collet (5). When fastening an object (T) to a spindle (1), an operating ring (67) is turned in a fastening direction to move the taper ring (60) axially so as to compress the collet (5) and, at the same time, the fastening nut (2) is screwed on an externally threaded part (1a) of the spindle (1). When removing the object (T) from the spindle (1), the operating ring (67), which can be easily turned, in an unfastening direction to remove a compressive force acting on the collet (5) by axially moving the taper ring (60) so that an axial fastening force is removed from the object (T). Then, the fastening nut (2) can be easily turned to remove the object (T) from the spindle (1). The fastening device can be operated by hand without using any special tool to produce a high fastening force for fastening and to remove the high fastening force for unfastening.

20 Claims, 12 Drawing Sheets

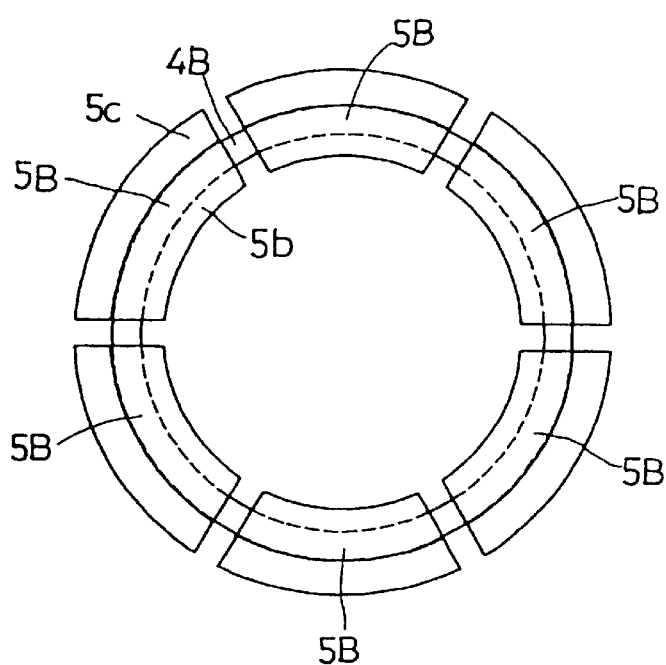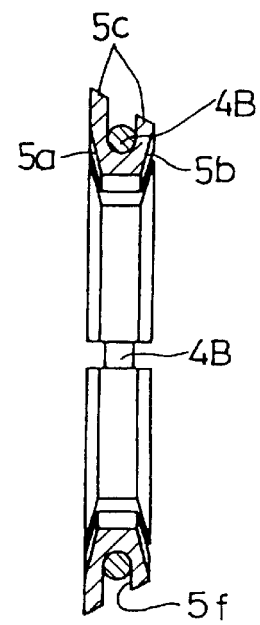
FIG. 4A   FIG. 4B
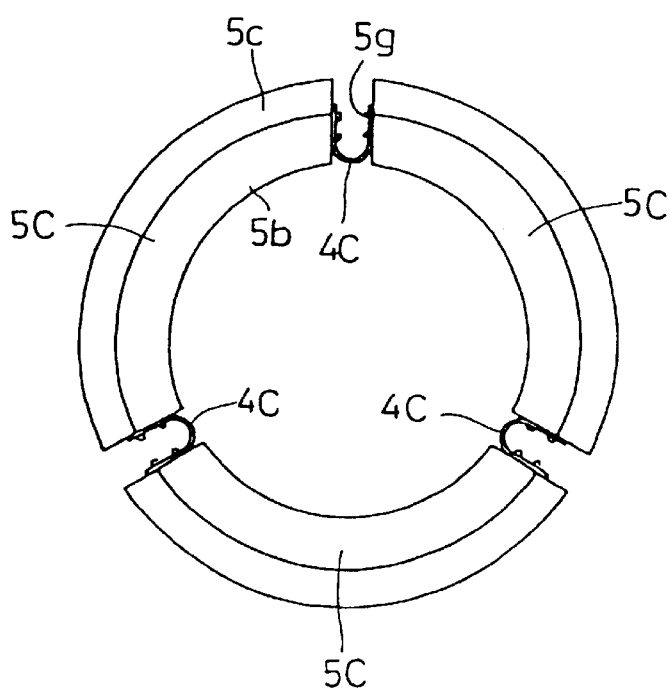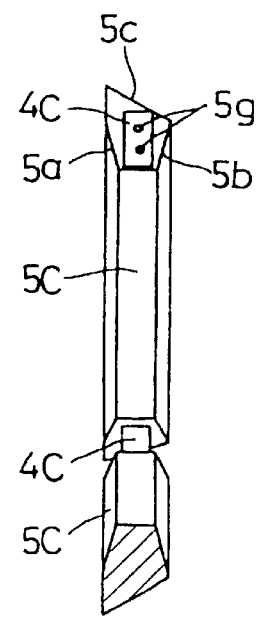
FIG. 5A   FIG. 5B

COLLET AND FASTENER USING SAME

TECHNICAL FIELD

The present invention relates to a fastening device for fastening a tool or the like to a member and, more specifically, to a fastening device capable of fastening a tool or the like to the flange of the member by axially pressing the tool or the like by a fastening flange pressed by fastening a fastening nut screwed on an externally threaded end part of the member.

BACKGROUND ART

In a conventional method of fastening a rotary tool, such as a grinding wheel or a cutter, to a spindle by axially pressing the rotary tool, the rotary tool is pressed axially with a fastening nut screwed on an externally threaded end part of the spindle to hold the rotary tool between a flange formed on the spindle and the fastening nut. Generally, the hand of the external thread of the spindle and the internal thread of the fastening nut is determined so that the fastening nut may be turned in a fastening direction by its own inertia at the start of rotation to maintain the fastening force of the fastening nut during rotation.

It is difficult to unfasten the fastening nut by hand when removing the rotary tool which has been fastened tighter by the increasing fastening effect of the fastening nut during operation for an extended period of time under severe conditions. A fastening device for axially fastening a tool disclosed in JP-2-502359 B incorporates a technique developed to solve such a problem.

As shown in FIGS. 14A and 14B, a prior art fastening device has a fastening nut 102 screwed on a threaded end part 101a of a spindle 101, and a fastening disk 103 axially movably fitted on the fastening nut 102 and restrained from turning. The respective holding surfaces 102a and 103a of the fastening nut 102 and the fastening disk 103 are formed so as to define a space having a V-shaped cross section. Three support members 104 having the shape of a segment and a V-shaped cross section corresponding to that of the space defined by the holding surfaces 102a and 103a are supported for radial movement in the space between the holding surfaces 102a and 103a.

Raceways 104a for balls 105 are formed in the outer side surfaces of the support members 104. An operating member 106 provided with a raceway 106a in its inner circumference is interposed between the fastening nut 102 and the fastening disk 103 and is supported by the three balls 105 which roll along the circumferential raceways 104a and 106a. Three recesses 106b are formed in the raceway 106a of the operating member 106. The turning range of the operating member 106 is defined by stoppers 107 and 108, and the operating member 106 is biased by springs 109 in the fastening direction of the fastening nut 102.

When unfastening a tool 110 fastened to the spindle 101 by the fastening device thus constructed, the operating member 106 is turned by hand in the unfastening direction of the fastening nut 102. The operating member 106 supported by the balls 105 is turned against the forces of the springs 109, and the balls 105 drop into the recesses 106b. Consequently, the support members 104 are able to move radially outward, and the fastening disk 103 is able to move axially away from the tool 110, so that the fastening nut 102 can be easily unfastened.

The fastening device of the prior art disclosed in JP-2-502359 B for axially pressing a tool to fasten the same has a complicated construction, comprises a large number of parts, is expensive, has problems in the stability of operation, operability and durability, and is capable of being applied to a limited purpose for fastening a rotary tool. The present invention has been made by solving those problems in the prior art and it is an object of the present invention to provide a fastening device having a simple construction, inexpensive, capable of stable operation, and capable of being easily fastened and unfastened by a force exerted thereon by finger tips without using any special tool. The fastening device of the present invention is applicable to fastening various stationary members as well as rotary tools.

DISCLOSURE OF THE INVENTION

With the foregoing object in view, the present invention provides a collet having side surfaces formed in first tapered surfaces respectively having V-shaped cross sections and capable of exercising a wedge action on adjacent members, and an outer circumference formed in a second tapered surface and capable of converting an axial force into a radial force, of reducing its diameter when a radial, compressive force is applied thereto to move the first tapered side surfaces radially to increase distance between the adjacent members, of increasing its diameter and of radially moving the first tapered surfaces when the distance between the adjacent members is reduced by an axial pressure of the adjacent members.

The present invention provides, to achieve the foregoing object, a collet structure comprising; a collet having side surfaces formed in first tapered surfaces respectively having V-shaped cross sections and capable of exercising a wedge action on adjacent members, and an outer circumference formed in a second tapered surface and capable of converting an axial force into a radial force, of reducing its diameter when a radial, compressive force is applied thereto to move the first tapered side surfaces radially to increase distance between the adjacent members, of increasing its diameter and of radially moving the first tapered surfaces when the distance between the adjacent members is reduced by an axial pressure of the adjacent members; and a taper ring having a taper inner circumference mating with the second tapered surface. The taper ring moves axially relative to the collet to apply a radial force to the collet.

The present invention provides, to achieve the foregoing object, a fastening device comprising a support member for supporting an object, having an externally threaded part, a fastening nut screwed on the externally threaded part, and a fastening ring fitted on the fastening nut coaxially with the fastening nut so as to be interposed between the fastening nut and the object supported on the support member, to be axially movable relative to the fastening nut and to press the object in a direction in which the fastening nut advances when the fastening nut is screwed on the externally threaded part of the support member. The fastening nut and the fastening ring have axially opposite end surfaces, respectively, each having a V-shaped cross section and serving as a support surface, an annular collet is interposed between the support surfaces, the collet has side surfaces formed in first tapered surfaces subject to the action of the support surfaces, and an outer circumference formed in a second tapered surface for converting an axial force applied thereto into a radial force, the axial distance between the fastening nut and the fastening ring is increased by reducing the diameter of the collet by applying a radial compressive force to the collet to move the first tapered surfaces radially inward, the diameter of the collet can be increased by reducing the distance between the fastening nut and the fastening ring by axial pressing the fastening nut and the fastening ring to move the first tapered surfaces radially outward, and an operating member applies an axial force to the second tapered surface of the collet.

BRIEF DESCRIPTION OF THE DRAWINGS

FIGS. 4A and 4B are a front view and a sectional side view, respectively, of a clamped segment collet;

FIGS. 5A and 5B are a front view and a sectional side view, respectively, of a built-up segment collet;

BEST MODE FOR CARRYING OUT THE INVENTION

Preferred embodiments of the present invention will be described hereafter with reference to the accompanying drawings.

Figure 1A:
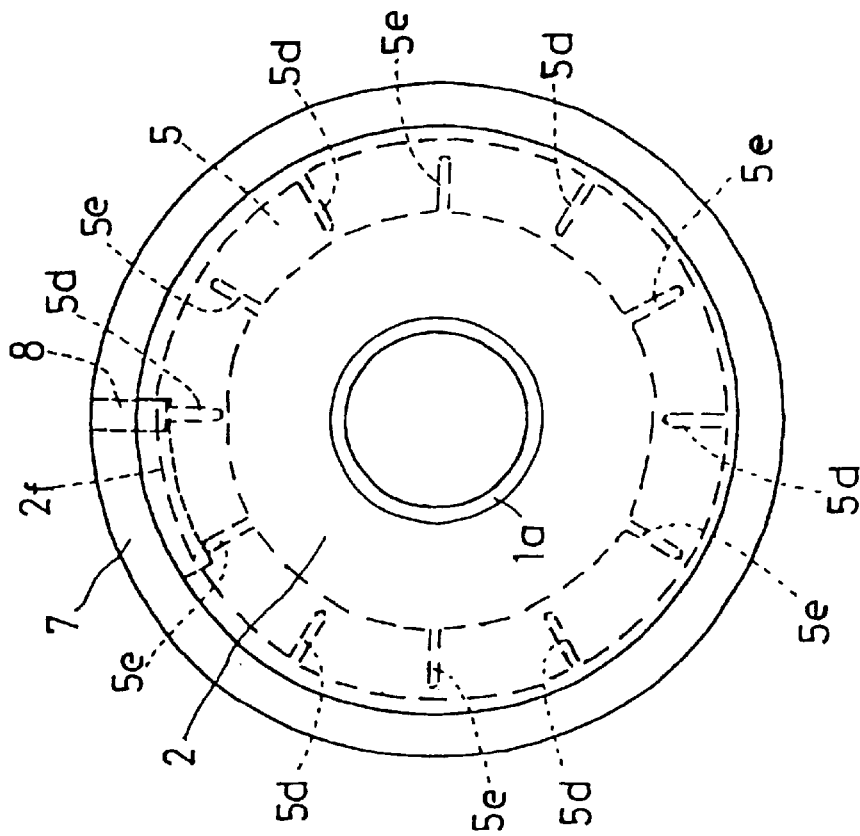
FIGS. 1A and 1B are a front view and a sectional side view, respectively, of a fastening device in a first embodiment of the present invention
Figure 1B:
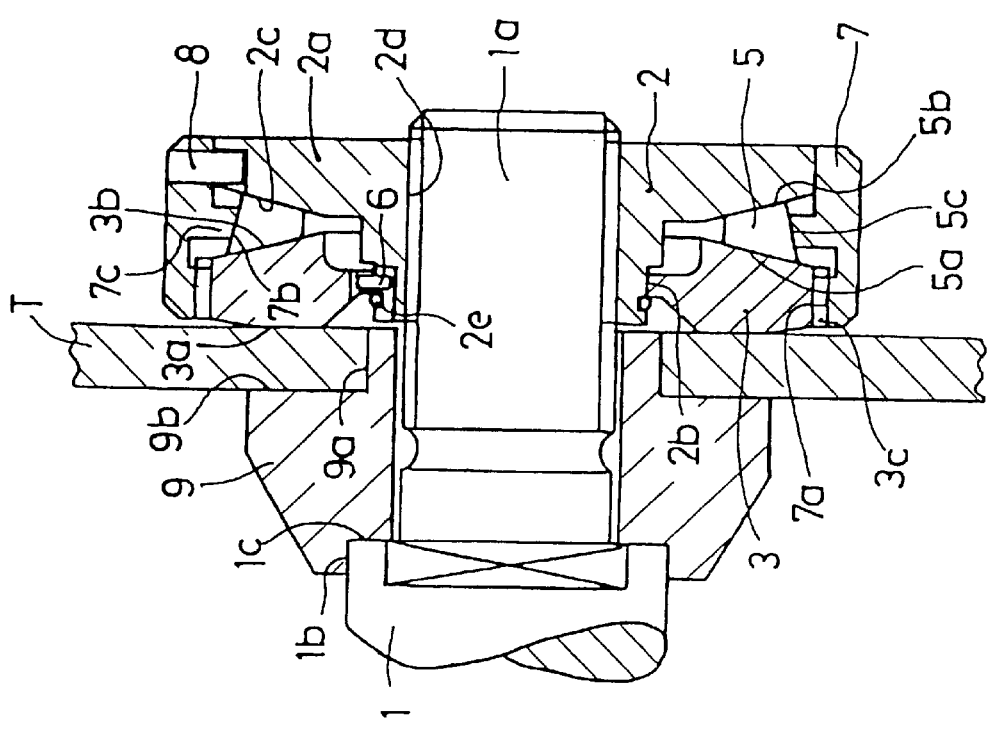

A fastening device in a first embodiment of the present invention for axially fastening a rotary tool will be described with reference to FIG. 1A showing the fastening device in a front view, FIGS. 1B showing the fastening device in a sectional side view, and FIGS. 2A to 6 showing collets of different types.

A spindle 1 has an externally threaded end part 1a. A tool support member 9, i.e., an annular member, is fitted on an end part 1b of the spindle 1 so as to be in contact with an end surface 1c of the spindle 1. The tool support member 9 has an end surface 9b, and a boss 9a projecting from the end surface 9b. A rotary tool T is fitted on the boss 9a so as to be in contact with the end surface 9b. The hand of the external thread of the externally threaded part 1a of the spindle 1 and that of the internal thread 2d of a fastening nut 2 are determined so that the fastening nut 2 screwed on the externally threaded part 1a is urged in a fastening direction when the spindle 1 rotates.

The fastening nut 2 has a flange 2a on its front side and a reduced part having a guide surface 2b on its back side. A fastening ring 3 is supported on the guide surface 2b so as to be axially movable and is restrained from turning relative to the fastening nut 2 with a detaining member 6. The fastening ring 3 is prevented from coming off the guide surface 2b with a snap ring 2e. The detaining member 6 may be a pin as shown in FIG. 1B, a key, a square hole or a spline. The fastening ring 3 has a contact surface 3a facing the tool support member 9 and in contact with the rotary tool T, and an end surface 3b facing the flange 2a. The end surface 3b of the fastening ring 3, and the end surface 2c of the fastening nut 2 facing the fastening ring 3 are support surfaces (guide surfaces) having V-shaped sectional shapes each of a relatively large obtuse vertex angle and expanding away from each other, respectively. The fastening ring 3 is provided in its outer circumference with an external thread 3c of the same hand as that of the external thread of the externally threaded part 1a.

Figure 2A:
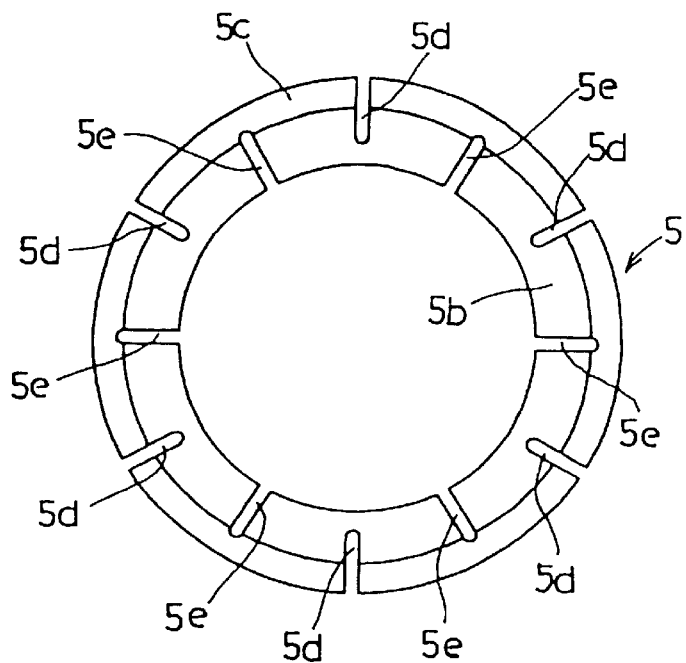
FIGS. 2A and 2B are a front view and a sectional side view, respectively, of a collet with slits.
Figure 2B:
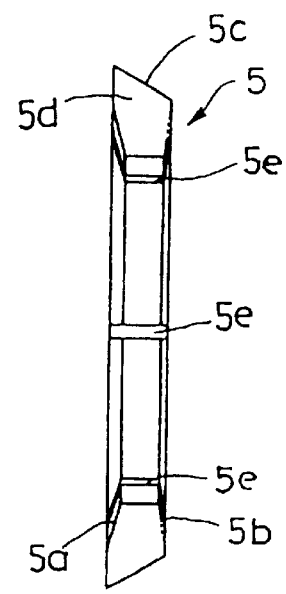

The guide surface 2c of the fastening nut 2 and the guide surface 3b of the fastening ring 3 disposed opposite to the guide surface 2c guide an annular collet 5. As shown in FIGS. 2A and 2B, the annular collet 5 guided by the opposite guide surfaces 2c and 3b of the fastening nut 2 and the fastening ring 3 has opposite side surfaces 5a and 5b of V-shaped sections complementary respectively to the guide surfaces 3b and 2c, and a tapered outer circumference 5c having a large end on the side of the fastening ring 3. The opposite side surfaces 5a and 5b are first tapered surfaces, and the tapered outer circumference 5d is a second tapered surface. The collet 5 is provided with outer radial slits 5e opening in the outer circumference thereof and arranged at equal angular intervals, and inner radial slits 5e opening in the inner circumference thereof and arranged at equal angular intervals. The outer radial slits 5d and the inner radial slits 5e are arranged alternately. The radial slits 5d and 5e enables the radial distortion of the collet 5; the outside diameter of the collet 5 can be reduced by a pressure radially compressing the collet 5, and can be increased by the wedge effect of an axial pressure.

A taper ring 7 has a rear end part provided with an internal thread 7a mating with the external thread 3c formed in the outer circumference of the fastening ring 3, a middle part internally provided with a circular rib 7c having a tapered inner circumference complementary to the tapered outer circumference 5c of the collet 5. Either the tapered outer circumference 5c or the tapered inner circumference 7b may be formed. A part of a predetermined length of the taper ring 7 is screwed on the outer circumference of the fastening ring 3 provided with the external thread 3c to bring the tapered inner circumference 7b into contact with the tapered outer circumference 5c to limit the increase of the outside diameter of the collet 5, and the tool T is axially fastened in place with the fastening nut 2 and the fastening ring 3 spaced a large distance apart. If the taper ring 7 is unfastened to release the collet 5, an axial pressure exerted by a fastening force increases the outside diameter of the collet 5, the distance between the fastening nut 2 and the fastening ring 3 decreases, so that an axial fastening force acting on the tool T is removed.

As shown in FIG. 1A, a circumferential groove 2f extending in a predetermined angular range is formed in the outer circumference of the flange 2a of the fastening nut 2, and a stopper 8 is attached to a part of the taper ring 7 corresponding to the circumferential groove 2f so as to project radially into the circumferential groove 2f. A range of tung of the taper ring 7 is limited by the circumferential groove 2f and the stopper 8.

A rotary tool fastening operation of the fastening device in the first embodiment will be described below.

When mounting the tool T on the spindle 1, the tool support member 9 is mounted on the spindle 1, and the tool T is fitted on the reduced part 9a of the tool support member 9 with the side surface thereof in contact with the end surface 9b. The fastening nut 2, the fastening ring 3 and the taper ring 7 are combined with the stopper 8 in contact with a circumferential end on the fastening side of the circumferential groove 2f so that the fastening nut 2, the fastening ring 3 and the taper ring 7 can be turned all together. The taper ring 7 is held by the outer circumference by hand, the fastening nut 2 is put to the extremity of the externally threaded part 1a of the spindle 1, and the taper ring 7 is turned to screw the fastening nut 2 on the externally threaded part 1a until the contact surface 3a of the fastening ring 3 comes into. contact with the tool T. Then the spindle 1 is driven for rotation by a driving motor, not shown, and, consequently, the fastening nut 2 is turned in a fastening direction by an inertial force exerted thereon at the start of rotation of the spindle 1, whereby a sufficient axial fastening force is applied to the tool T.

The axial force acting on the tool T is increased by the effect of inertia for extra tightening during the operation of the tool T. When removing the tool T thus firmly axially pressed, the taper ring 7 is held by hand by its outer circumference and is turned in an unfastening direction. A torque necessary for unfastening the taper ring 7 is dependent on the vertex angle of the V-shaped section of the collet 5, the pitches of the threads 3c and 7a, and the friction coefficient between the members in frictional contact with each other, and is far lower than an inertial torque for extra tightening.

The taper inner circumference 7b separates from the taper outer circumference 5c of the collet 5 while the taper ring 7 is turned in the unfastening direction before the stopper 8 is stopped by the circumferential end of the circumferential groove 2f on the unfastening side. Consequently, the radial, compressive force acting on the collet 5 is removed, the radial expansion of the collet 5 becomes possible, and the collet 5 is shifted so that its diameter increases by an axial pressure exerted by an inertial force on the collet 5 while the tool T is in use.

Thus the outside diameter of the collet 5 increases, the axial distance between the fastening nut 2 and the fastening flange 3 decreases, the axial force acting on the tool T is removed, the force acting between the external thread of the externally threaded part 1a and the internal thread 2d decreases and the fastening nut 2 can be easily unfastened.

Antifriction members or rolling members may be placed in the taper ring 7, between the external thread 3c and the internal thread 7a, and between the taper outer circumference 5c and the taper inner circumference 7b to reduce friction between those components in order that torque necessary to be applied to the fastening device to unfasten the fastening device may be reduced.

Actions to enable extra fastening by using an assisting mechanism when fastening the fastening device in the first embodiment will be described below.

When assembling the fastening device, the pressure radially compressing the collet 5 is adjusted to zero or to a pressure that reduces the outside diameter of the collet 5 in a free state slightly with the taper ring 7 set at an initial angular position where the stopper 8 of the taper ring 7 is in contact with the circumferential end of the circumferential groove 2f on the unfastening side.

Accordingly, resistance against the taper ring 7 increases as the taper ring 7 is turned in the fastening direction from the initial position.

When fastening the tool T to the spindle 1 by the fastening device thus adjusted, the taper ring 7 is held by hand so as to apply the fastening nut 2 to the extremity of the externally threaded part 1a of the spindle 1, and then the taper ring 7 is turned in the fastening direction. In the initial stage of turning of the taper ring 7 in the fastening direction, only the taper ring 7 turns. A torque necessary for turning the taper ring 7 increases slightly as the pin 8 approaches the circumferential end on the fastening side of the circumferential groove 2d. Thereafter, the fastening ring 3 and the fastening nut 2 are turned together with the taper ring 7, and the fastening nut 2 is screwed on the externally threaded part 1a.

The fastening nut 2 and the fastening ring 3 are thus turned further and the contact surface 3a of the fastening ring 3 is brought into contact with the tool T. Then, the torque necessary for turning the fastening nut 2 to mate the internal thread 2d of the fastening nut 2 with the external thread of the externally threaded part 1a increases sharply, and then only the taper ring 7 can be turned until the stopper 8 comes into contact with the circumferential end on the fastening side of the circumferential groove 2f.

The turning of only the taper ring 7 produces a wedge effect which applies a radial, compressive force to the collet 5. Consequently, the outside diameter of the collet 5 is reduced and the axial distance between the fastening nut 2 and the fastening ring 3 is increased. The assisting mechanism using the wedge effect enables the tool T to be fastened firmly by the manual operation of the fastening device.

If an importance is attached to the dynamic balance of the fastening device, at least two sets each of the circumferential groove 2d and the stopper 8 may be arranged in central symmetry to secure the dynamic balance of the fastening device.

If the spindle 1 is braked or if the fastening device has a great diameter, it is preferable that the fastening device be provided with a locking mechanism which biases the taper ring 7 in the fastening direction with a spring, which will be described in connection with a second embodiment.

Figure 3A:
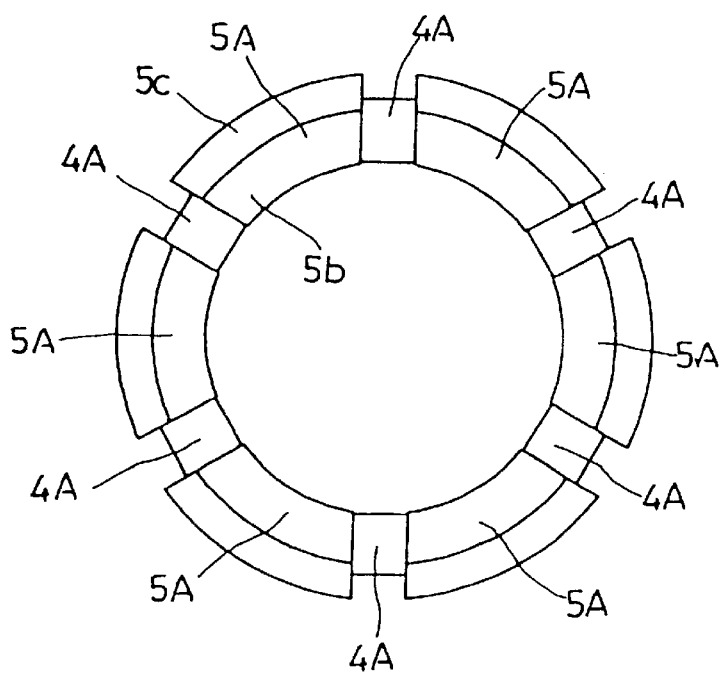
FIGS. 3A and 3B are a front view and a sectional side view, respectively, of a bonded segment collet.
Figure 3B:
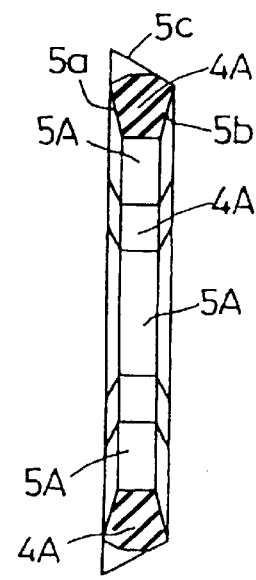

A bonded segment collet formed by bonding a plurality of segments 5A (six segments) connected in a ring by rubbery elastic members 4A interposed between the adjacent segments 5A as shown in FIGS. 3A and 3B may be used instead of the collet 5 provided with the radial slits 5d and 5e shown in FIGS. 2A and 2B.

The fastening device may be provided with a clamped segment collet as shown in FIGS. 4A and 4B formed by putting an elastic ring 4B, such as an O-ring, a ring of a coil spring or a ring of a piano wire, in grooves 5f formed in the outer surfaces of a plurality of segments 5B and bonding each segment 5B at a point to the elastic ring 4B.

The fastening device may be provided with a built-up segment collet as shown in FIGS. 5A and 5B formed by connecting a plurality of segments 5C in a ring to U-shaped spring plates 4C put between the adjacent segments 5C with pins or rivets 5g.

Figure 6:
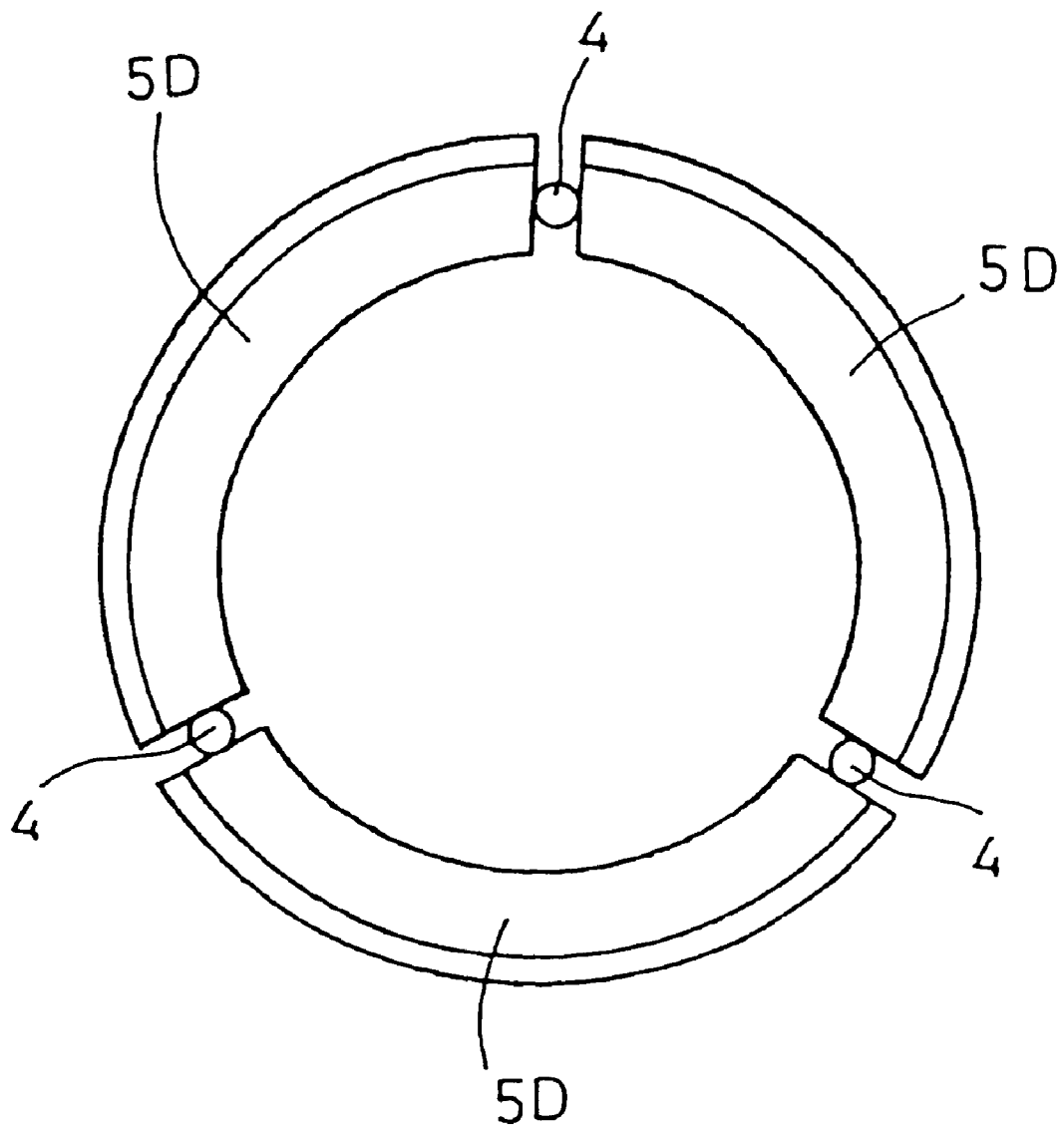
FIG. 6 is a front view of a split segment collet with positioning members.

The fastening device may be provided with a split segment collet as shown in FIG. 6 comprising a plurality of segments 5D arranged in a ring, and a member which determines intervals between the segments 5D and the circumferential positions of the segments 5D, such as a retainer, or pins 4 attached to the fastening nut 2 or the fastening ring 3.

Figure 7A:
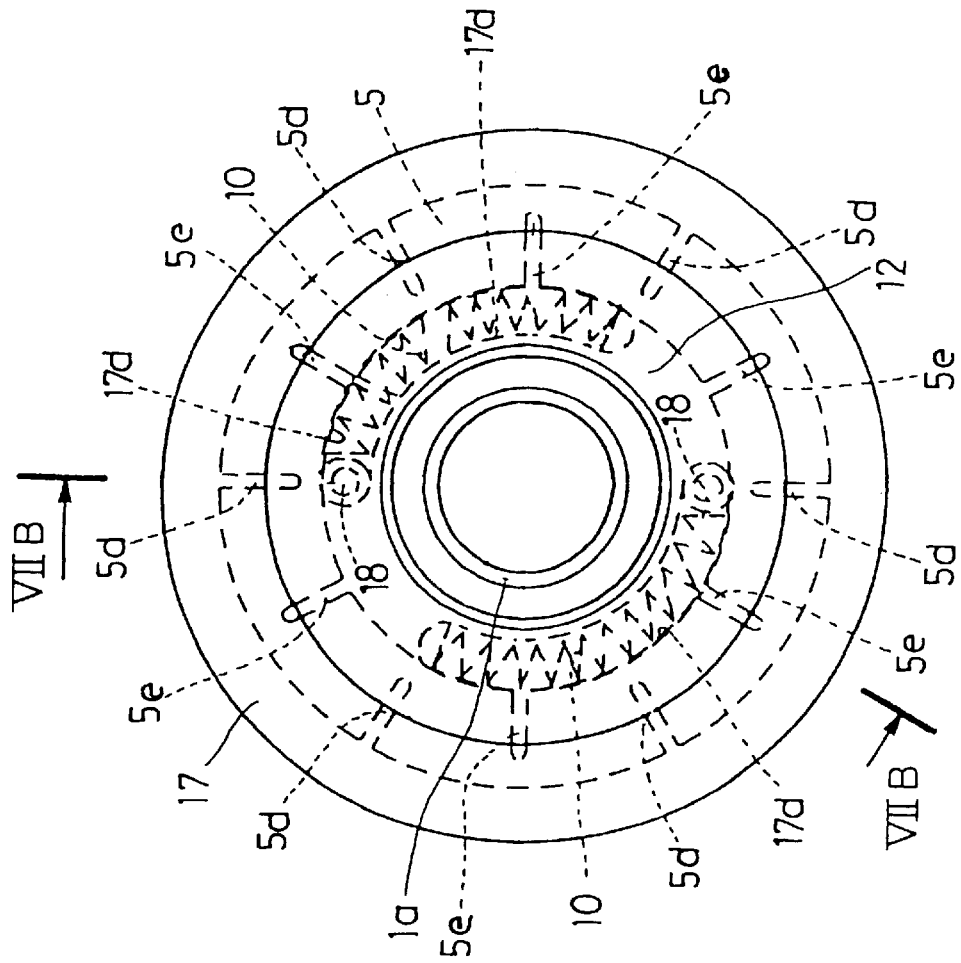
FIG. 7A is a front view and FIG. 7B is a sectional view taken on line VIIB—VIIB in FIG. 7A, respectively, of a fastening device in a second embodiment of the present invention.
Figure 7B:
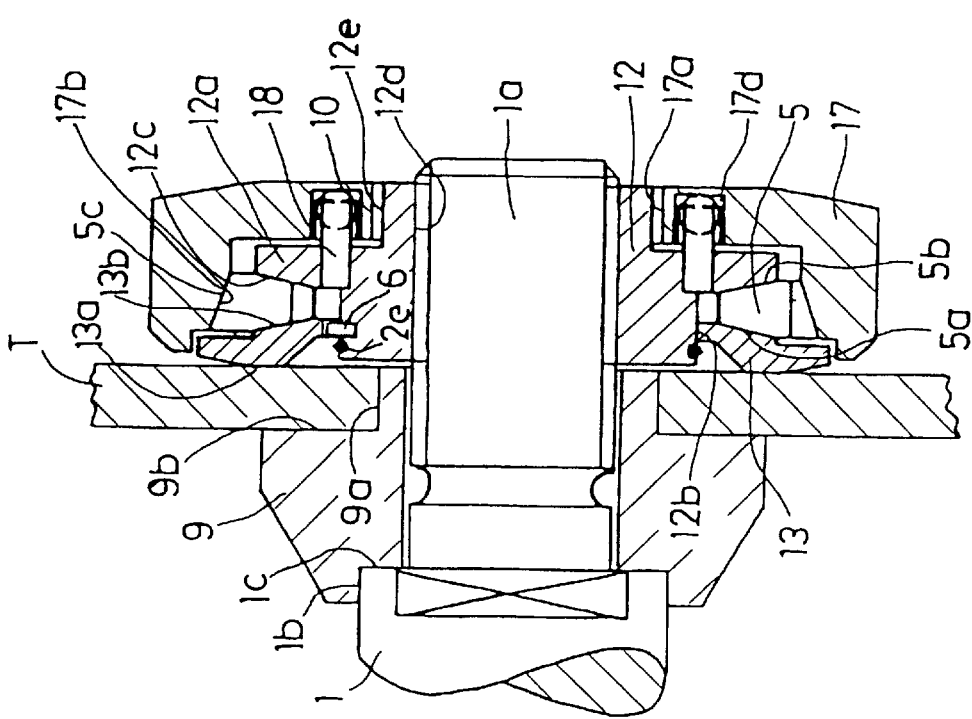

A fastening device in a second embodiment the present invention will be described with reference to FIGS. 7A and 7B showing the fastening device in the second embodiment in a front view and a sectional side view, respectively, in which parts like or corresponding to those of the first embodiment are designated by the same reference characters and the description thereof will be omitted to avoid duplication.

A spindle 1, a tool support member 9 and a tool T are the same as those described in connection with the first embodiment. A fastening nut 12 is provided with an internal thread 12d mating, with the externally threaded part 1a of the spindle 1. A fastening ring 13 is axially movably mounted on a rear end part of the fastening nut 12 having a circumference serving as a guide surface 12b, and is restrained from turning by a detaining member 6. The detaining member 6 is not indispensable to the second embodiment.

The fastening ring 13 has a rear end surface 13a to be in contact with the tool T. The front end surface 13b of the fastening ring 13, and the end surface 12c of a flange 12a formed on the fastening nut 12 opposite the inner end surface 13b of the fastening ring 13 are formed, like the corresponding surfaces of the first embodiment, in guide surfaces each having a V-shaped section.

The fastening nut 12 has a front end part provided with an external thread 12e of the same hand as that of the external thread of the externally threaded part 1e of the spindle 1. A collet 5 similar to that employed in the first embodiment is interposed between the guide surfaces 12c and 13b respectively having V-shaped sections of the fastening nut 12 and the fastening ring 13 so as to be radially expandable and contractible.

A taper ring 17 is provided on the inner circumference of a front end part thereof with an internal thread 17a mating with the external thread 12e, and in its middle part with a tapered surface 17b fitting the tapered surface 5c, i.e., the outer circumference, of the collet 5.

When the taper ring 17 is screwed on the front end part of the fastening nut 12 provided with the external thread 12e, a radial, compressive force acts on the outer circumference of the collet 5, whereby an axial force pressing the fastening ring 13 is produced to fasten the tool T by the fastening ring 13.

Stoppers 18 are attached to the flange 12a of the fastening nut 12 in center symmetrical arrangement so as to project forward. Two circular circumferential guide grooves 17d are formed in the taper ring 17 in a center symmetrical arrangement so as to correspond to the stoppers 18, respectively. A spring 10 is placed in each of the guide grooves 17d so as to be in contact with a side surface of the stopper 18 to bias the taper ring 17 in a fastening direction relative to the fastening nut 12.

The second embodiment differs from the first embodiment in that the external thread 12e mating with the internal thread 17a of the taper ring 17 is formed on the outer circumference of the front end part of the fastening nut 12 instead of in the fastening ring.

When the taper ring 17 is turned against the resilience of the springs 10 until the springs 10 are fully compressed, the radial expansion of the collet 5 becomes possible to remove an axial force produced by an extra tightening action of inertia, and the fastening nut 12 and the fastening ring 13 can be turned together with the taper ring 17 so that the fastening nut 12 can be removed from the externally threaded part 1a of the spindle 1.

The bonded segment collet 5A shown in FIGS. 3A and 3B, the clamped segment collet 5B shown in FIGS. 4A and 4B, the built-up segment collet 5C shown in FIGS. 5A and 5B or the split segment collet 5D shown in FIG. 6 may be employed instead of the collet 5.

Figure 8A:
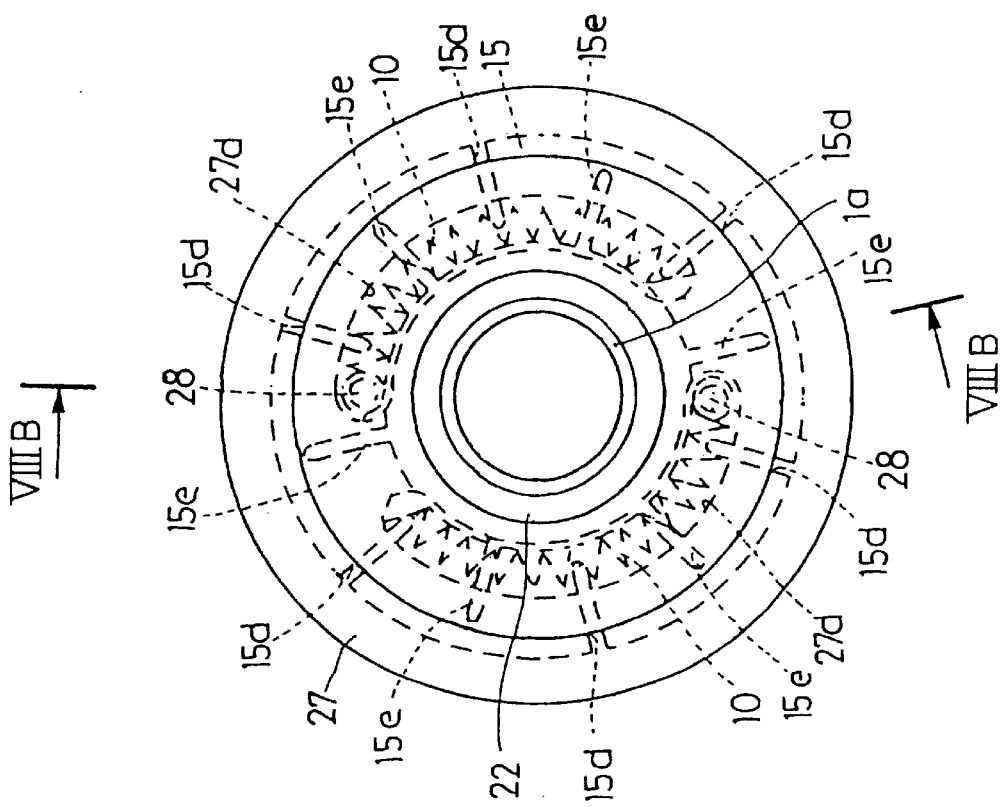
FIG. 8A is a front view and FIG. 8B is a sectional view taken on line VIIB—VIIB in FIG. 7A, respectively, of a fastening device in a third embodiment of the present invention.
Figure 8B:
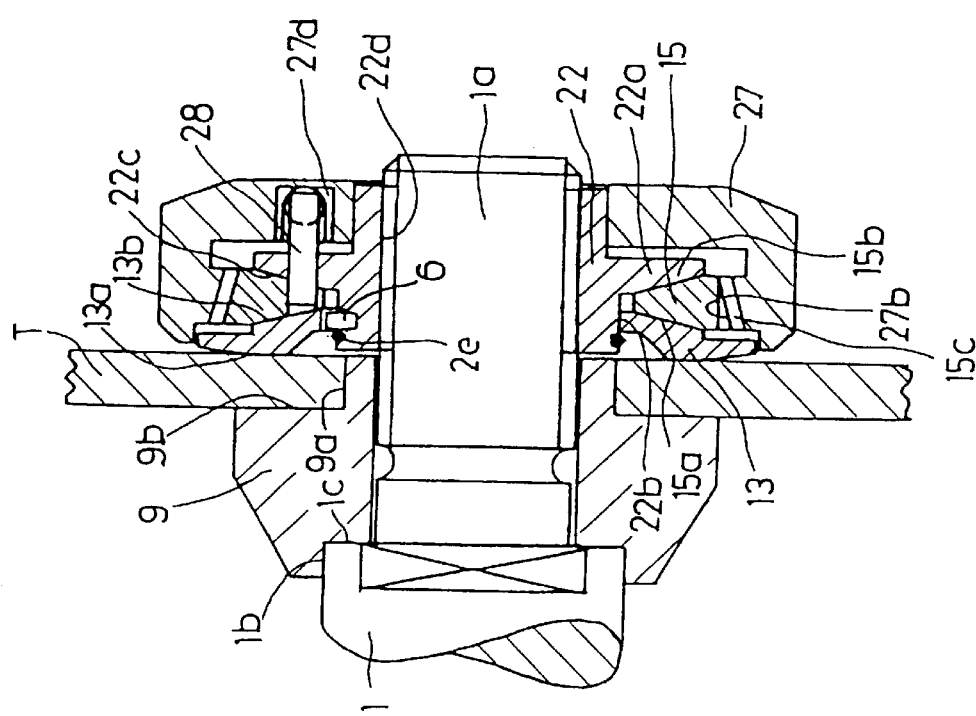

A fastening device in a third embodiment of the present invention will be described with reference to FIGS. 8A and 8B showing the fastening device in the third embodiment in a front view and a sectional side view, respectively, in which parts like or corresponding to those of the frst embodiment are designated by the same reference characters and the description thereof will be omitted to avoid duplication.

A fastening nut 22 is provided with an internal thread 22d mating with an external thread formed in an externally threaded part 1a of a spindle 1 and has a rear end part having an outer circumference serving as a guide surface 22b. A fastening ring 13 is axially movably mounted on the rear end part having the guide surface 22b of the fastening nut 22 and is restrained from turning by a detaining member 6. The fastening ring 13 is the same as the fastening ring employed in the second embodiment. The front end surface 13b of the fastening ring 13, and the end surface 22c of a flange 22a formed on the fastening nut 22 opposite the inner end surface 13b of the fastening ring 13 are formed in guide surfaces each having a V-shaped section. A collet 15 is interposed between the guide surfaces respectively having V-shaped sections so as to be radially expandable and contractible.

The collet 15 is provided with slits 15d and 15e, and has a taper outer circumference having a large end on the side of the fastening ring 13 and provided with an external tapered thread 15c. Stoppers 28 attached so as to extend axially to a flange 22a formed on the fastening nut 22 determines the angular range of turning of the collet 15. A taper ring 27 is provided in its inner circumference with an internal taper thread 27b mating with the external taper thread 15c. The taper ring 27, similarly to the taper ring 17 employed in the second embodiment, is provided with circular circumferential guide grooves 27d, and a spring 10 is placed in each of the guide grooves 27d so as to be in contact with a side surface of the stopper 28 to bias the taper ring 27 in a fastening direction relative to the fastening nut 22.

20 Balls may be placed in a space formed between the tapered threads 15c and 27b to construct a taper ball screw.

A radial, compressive force can be applied through the external taper thread 15c to the collet 15 by turning the taper ring 27 of the fastening device in the third embodiment in a fastening direction. An additional, radial, compressive force produced by an inertial force can be removed from the collet 15 and the radial expansion of the collet 15 can be made possible by turning the taper ring 27 in an unfastening direction to loosen the engagement of the internal taper thread 27b and the external taper thread 15c.

Figure 9A:
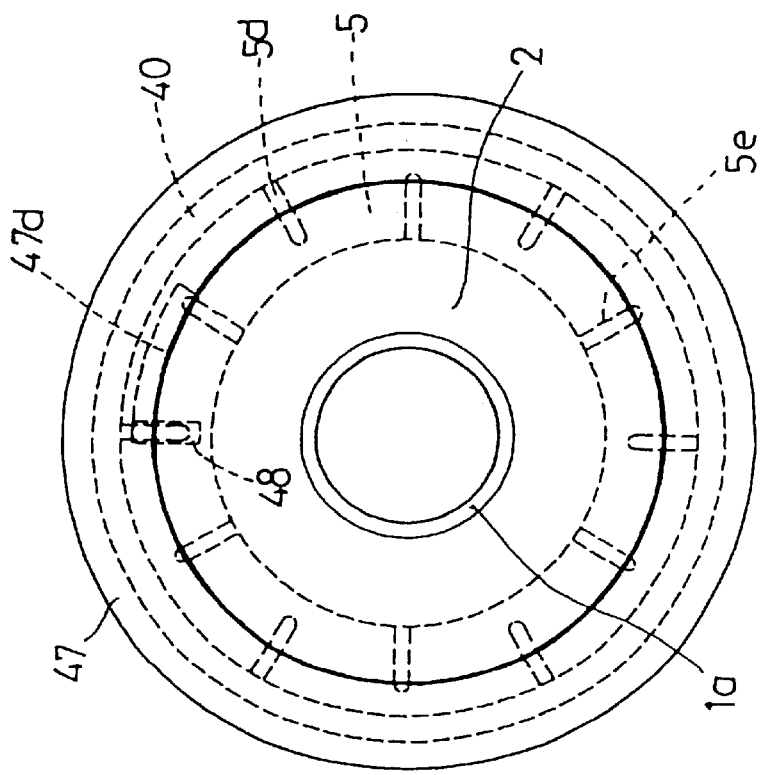
FIGS. 9A and 9B are a front view and a sectional view, respectively, of a fastening device in a fourth embodiment of the present invention.
Figure 9B:
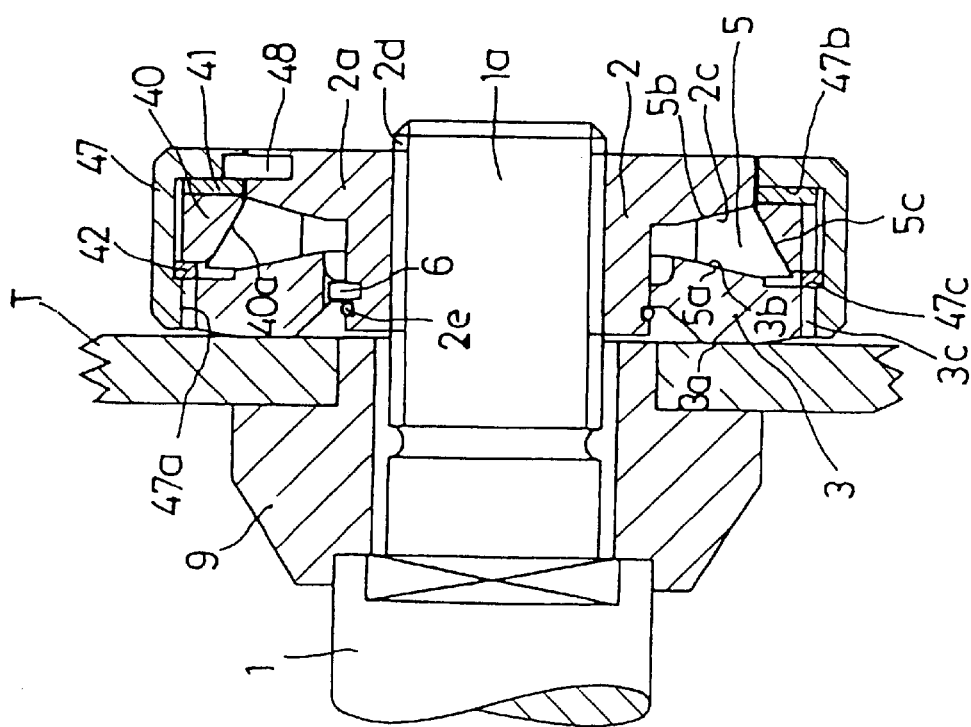

A fastening device in a fourth embodiment of the present invention will be described with reference to FIGS. 9A and 9B showing the fastening device in the third embodiment in a front view and a sectional side view, respectively, in which parts like or corresponding to those of the first embodiment are designated by the same reference characters and the description thereof will be omitted to avoid duplication.

A spindle 1, a fastening nut 2 and a fastening ring 3 are the same as those of the first embodiment. The fastening ring 3 is axially movably mounted on the fastening nut 2 and is restrained from turning relative to the fastening nut 2 by a detaining member 6. A collet 5 is interposed between opposite guide surfaces respectively having V-shaped sections formed in the fastening nut 2 and the fastening ring 3 so as to be radially expandable and contractible.

The collet 5 has an outer circumference formed in a tapered surface 5c. A taper ring 40 having an inner circumference formed in a tapered surface 40a if fitted on the collet 5 so as to be axially movable. An antifriction sheet 41 of a material having a low frictional property, such as Teflon, is attached to a large end of the taper ring 40. Only either the outer circumference of the collet 5 or the inner circumference of the taper ring 40 may be formed in a tapered surface. Rolling members may be interposed between the tapered surfaces 5c and 40a, which will be described later, to reduce resistance against the movement of the tapered surfaces 5c and 40a relative to each other.

An operating ring 47 has a circumferential wall having a rear end flange provided with an internal thread 47a mating with an external thread 3c formed in the fastening ring 3, and a front flange having an inner end surface serving as a contact surface 47b in contact with the antifriction sheet 41.

An antifriction sheet 42 is interposed between the inner end surface 47c of the rear end flange and the taper ring 40. The taper ring 40 rotatably disposed between the antifriction sheets 41 and 42 in the operating ring 47 is restrained from axial movement.

Although not illustrated in the figures, the operating ring 47 is an assembly built up by attaching the front end flange to a body member so that the taper ring 40 can be housed therein. When the operating ring 47 is turned, the taper ring 40 is moved axially relative to the collet 5 to make the outside diameter of the collet increase or decrease.

A reaction force acts in an unfastening direction on the taper ring while the fastening device is fastened. Therefore, the antifriction sheet 42 that functions only when the fastening device is unfastened may be omitted if the cone angle of the tapered surface 40a is large.

A stopper 48 is attached so as to project radially outward to a flange 2a formed on the fastening nut 2. A circular circumferential groove 47d is formed so as to extend in a predetermined angular range in a part of the operating ring 47 corresponding to the stopper 48. The stopper 48 and the circumferential groove 47d limits the range of turning of the operating ring 47 to an angular range corresponding to the angular range of the circumferential groove 47d. The stopper 48 may be attached, similarly to the stopper 8 of the first embodiment, to the operating ring 47 and the circumferential groove 47d may be formed, similarly to the circumferential groove 2f of the first embodiment, in the outer circumference of the fastening nut 2.

The operation of the fourth embodiment will be described. When assembling the fastening device, the radial, compressive force for radially compressing the collet 5 is adjusted to zero or to a value sufficient for reducing the outside diameter of the collet 5 in a free state slightly with the operating ring 47 set at an initial angular position where the circumferential end on the fastening side of the circumferential groove 47d is in contact with the stopper 48 and the taper ring 40 in contact with the side surface of the antifriction sheet 41. Accordingly, resistance against the operating ring 47 increases as the operating ring 47 is turned in the fastening direction from the initial angular position.

When fastening a tool T to the spindle 1 by the fastening device thus adjusted, the operating ring 47 is held by hand at an end position on the unfastening side so as to apply the fastening nut 2 to the extremity of the externally threaded part 1a of the spindle 1, and then the operating ring 47 is turned in the fastening direction. In the initial stage of turning of the operating ring 47 in the fastening direction, only the operating ring 47 can be lightly turned. A torque necessary for turning the operating ring 47 increases slightly as the stopper 48 approaches the circumferential end on the fastening side of the circumferential groove 47d. Thereafter, the fastening ring 3 and the fastening nut 2 are turned together with the operating ring 47 and the fastening nut 2 is screwed on the externally threaded part 1a.

As the fastening nut 2 is screwed further on the externally threaded part 1a, the contact surface 3a of the fastening ring 3 comes into contact with the tool T and the fastening nut 2 is moved toward the fastening ring 3. Consequently, the guide surface 2c of the fastening nut 2 comes into contact with the side surface 5b of the collet 5. Then, the torque necessary for turning the fastening nut 2 relative to the externally threaded part 1a increases sharply, and then only the operating ring 47 can be turned until the stopper 48 comes into contact with the circumferential end on the fastening side of the circumferential groove 47d. In this state, the collet 5 having the V-shaped section is radially compressed by a wedge effect of the axially backward movement of the taper ring 40, whereby the axial distance between the fastening nut 2 and the fastening ring 3 is increased. An assisting mechanism employing such a double wedge enables the manual firm fastening of the tool T to the spindle 1 by an axial force.

When removing the tool T from the spindle 1, the operating ring 47 is held by the outer circumference by hand and the operating ring 47 is turned in an unfastening direction, i.e., in a direction to bring the end of the circumferential groove 47d on the unfastening side into contact with the stopper 48. Then, the operating ring 47 moves the taper ring 40 axially forward by pushing the taper ring 40 by its end surface 47c in contact with the antifriction sheet 42. Consequently, the radial expansion of the collet 5 becomes possible, the large axial pressure firmly holding the tool T is removed, the fastening nut 2 can lightly be turned relative to the externally threaded part 2a and the tool T can be easily removed from the spindle 1.

Figure 10A:
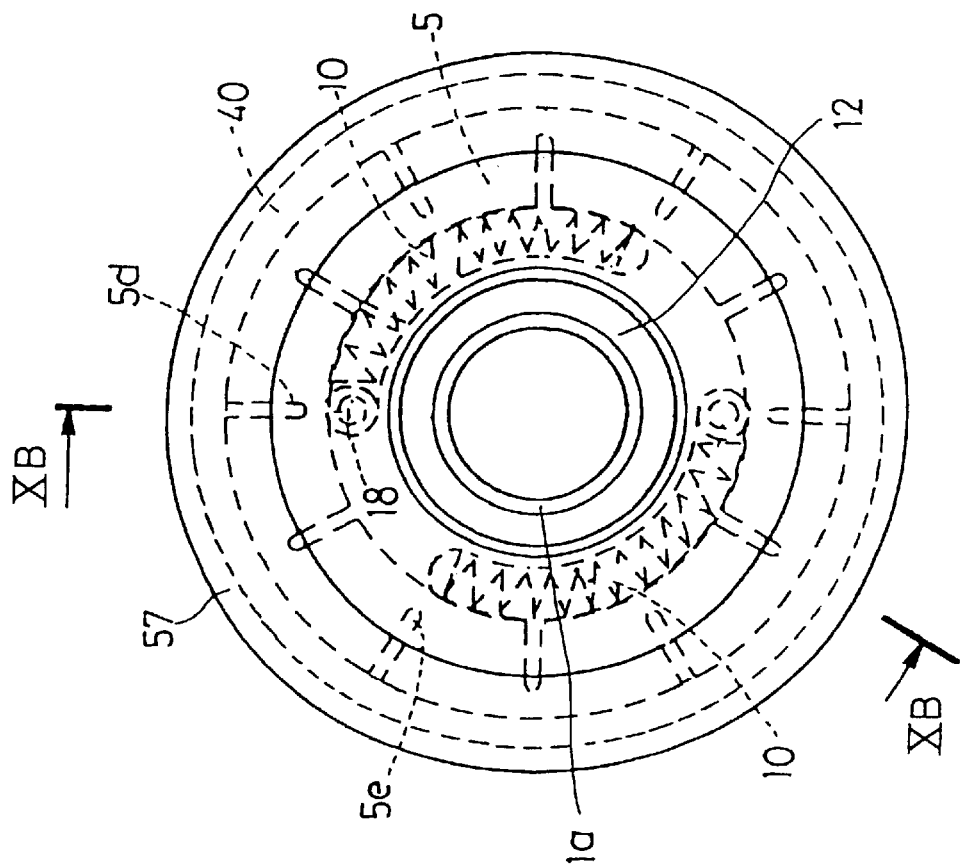
FIG. 10A is a front view and FIG. 10B is a sectional view taken on line XB—XB in FIG. 10A, respectively, of a fastening device in a fifth embodiment of the present invention.
Figure 10B:
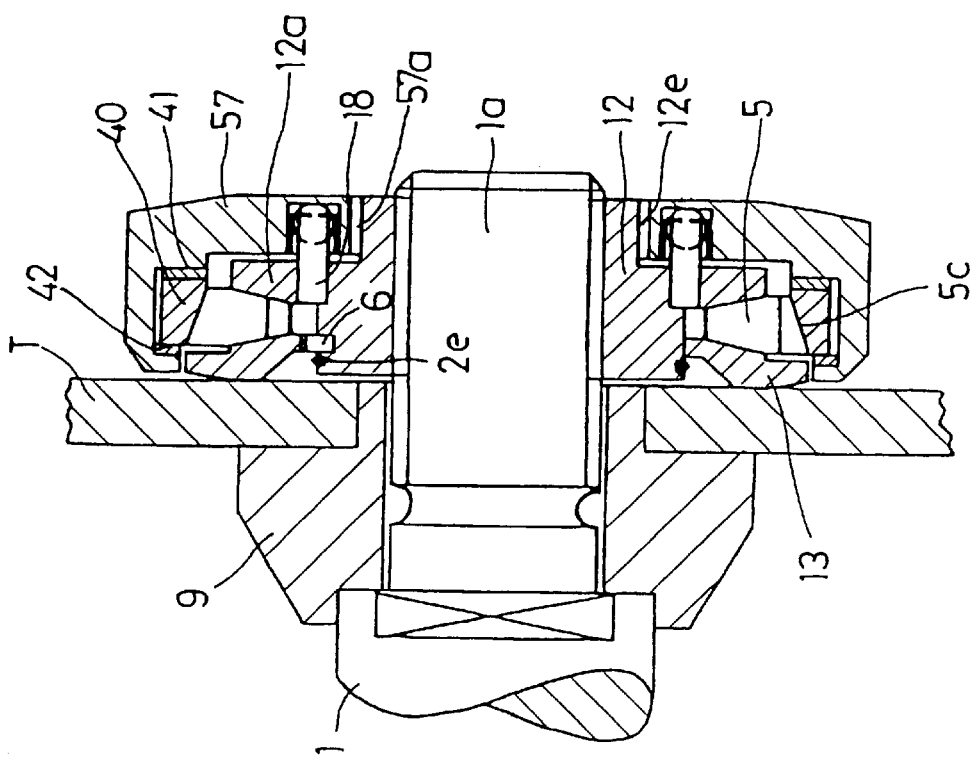

A fastening device in a fifth embodiment of the present invention will be described with reference to FIGS. 10A and 10B showing the fastening device in a front view and a sectional side view, respectively, in which parts like or corresponding to those of the second embodiment are designated by the same reference characters and the description thereof will be omitted. The fifth embodiment is substantially similar to the second embodiment and differs from the second embodiment only in applying a radial, compressive force to the outer circumference of a collet 5 by axially moving a taper ring 40 similar to that employed in the fourth embodiment in opposite directions through antifriction sheets 41 and 42 by turning an operating ring 57 provided with an internal thread 57a mating with an external thread 12e formed on a fastening nut 12 instead of directly pressing the tapered outer circumference 5c of the collet 5 by the tapered inner circumference 17b of an operating ring 17 provided with an internal thread 17a mating with the external thread 12e of the fastening nut 12.

The operation of the fifth embodiment is substantially the same as that of the second embodiment and hence the description thereof will be omitted.

Figure 11A:
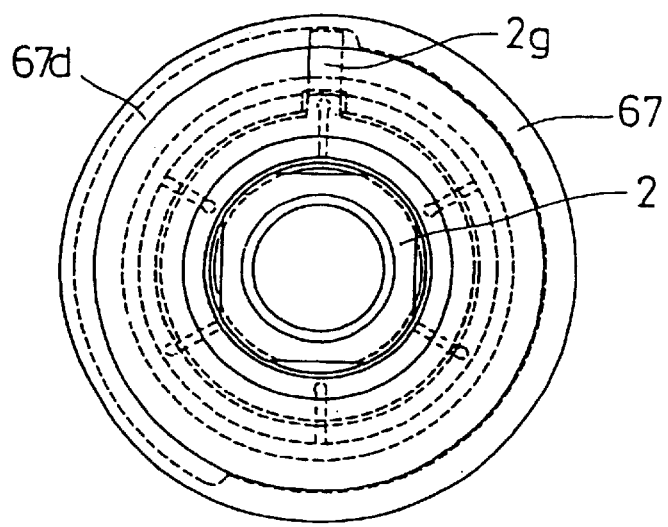
FIGS. 11A, 11B, 11C and 11D are a front view, sectional views in an unfastened state and a sectional front view, respectively, of a fastening device in a six embodiment of the present invention.
Figure 11B:
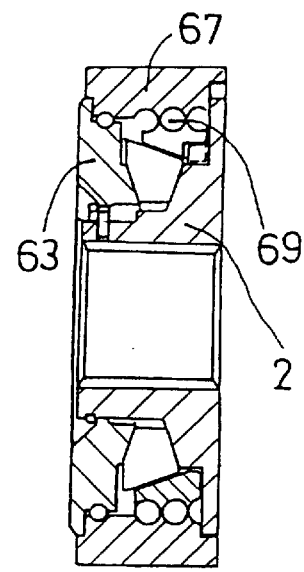
Figure 11D:
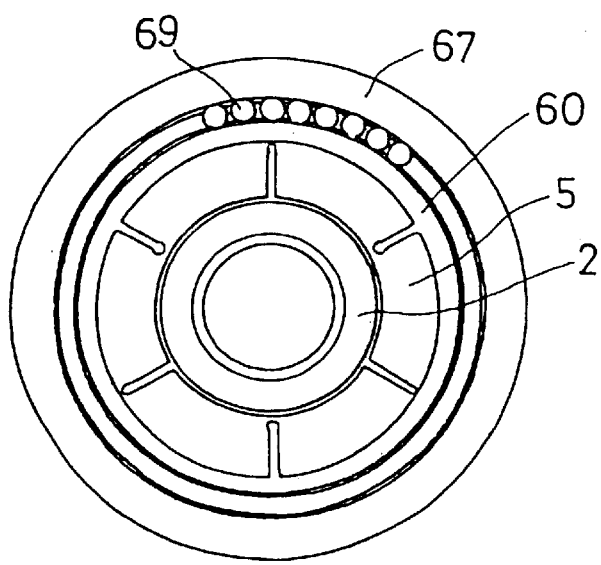
Figure 11C:
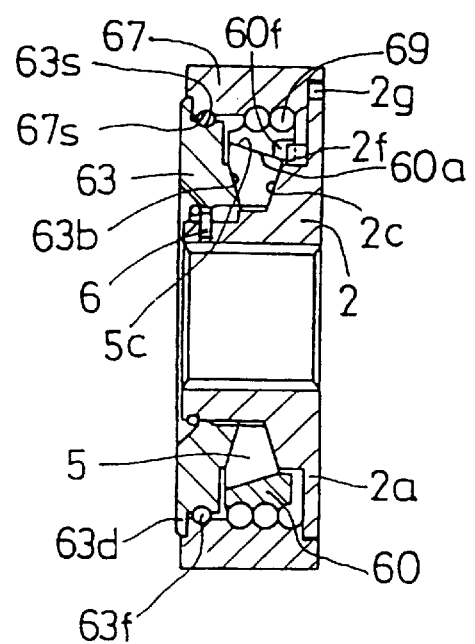

A fastening device in a sixth embodiment of the present invention will be described with reference to FIG. 11A showing the fastening device in a front view, FIG. 11B showing the fastening device in an unfastened state in a sectional view, FIG. 11C showing the fastening device in a fastened state in a sectional view, and FIG. 11D showing the fastening device in a sectional front view, in which parts like or corresponding to those of the first embodiment are designated by the same reference characters and the description thereof will be omitted.

The sixth embodiment is characterized by a ball screw mechanism constructed by providing a ball screw between an operating ring 60 and a taper ring 60. The taper ring 67 is shifted axially without being turned by turning the operating ring 67 by hand. The operating ring 67 and the taper ring 60 may be engaged simply by mating threads. Since an operating member is required only to shift the taper ring 60 axially relative to a collet 5, the operating member may be a cam capable of axially moving the taper ring 60.

The fastening device is used for fastening general machine parts as well as tools.

As shown in FIG. 11B, a fastening nut 2 and a fastening ring 63, similarly to those of the first embodiment, to be mounted on a spindle 1 are combined by mounting the fastening ring 63 on a reduced cylindrical part of the fastening nut 2, a detaining pin 6 attached to the reduced cylindrical part of the fastening nut 2 is in engagement with a groove formed in the inner circumference of the fastening ring 63, and the fastening ring 63 is able to turn together with the fastening nut 2 and is able to move axially on the reduced cylindrical part of the fastening nut 2.

The fastening nut 2 and the fastening ring 63 have opposite guide surfaces 2c and 63b having V-shaped section, respectively. A collet 5 having a tapered outer circumference 5c is supported on the guide surfaces 2c and 63b so as to be radially expandable and contractible. The tapered outer circumference 5c of the collet 5 has small end on the side of the tapered guide surface 2c of the fastening nut 2, and a large end on the side of the tapered guide surface 63b of the fastening ring 63.

A taper ring 60 having a tapered inner circumference 60a mating with the tapered outer circumference 5c is mounted on the collet 5 so as to be movable in directions parallel to the axis of a spindle 1. Rolling members may be interposed between the tapered outer circumference 5c and the tapered inner circumference 60a to reduce the resistance against the sliding movement of the taper ring 60 relative to the collet 5.

As shown in FIGS. 11B and 11D, guide grooves may be formed in the outer circumference of the taper ring 60 and the inner circumference of an operating ring 67, and steel balls 69 may be placed in the guide grooves to construct a ball screw mechanism.

The operating ring 67 is supported for rotation and restrained from axial movement by steel balls 63f placed in a guide groove 67s formed in the operating ring 67 and a guide groove 63s formed in the fastening ring 63.

When the operating ring 67 is turned by hand in a fastening direction, the taper ring 60 is moved toward the large end of the tapered outer circumference of the collet 5 to compress the collet 5, whereby the fastening ring 63 is moved toward an object to be fastened.

As shown in FIG. 11A, a projection 2f of the fastening nut 2 is in engagement with a groove 60f formed in the taper ring 60 so that the taper ring 60 turns together with the fastening nut 2. When the operating ring 67 is turned relative to the fastening nut 2, the taper ring 60 is moved axially.

A circular circumferential groove 67d is formed in a predetermined angular range in an end surface of the operating ring 67 facing a flange 2a formed on the fastening nut 2, and a stopper 2g attached to the outer circumference of the flange 2a of the fastening nut 2 is placed in the circumferential groove 67d to define the range of axial movement of the taper ring 60 on the collet 5.

The operation of the sixth embodiment will be described with reference to FIGS. 11B and 11C.

The taper ring 60 is at an unfastening position in FIG. 11B. In this state, the fastening nut 2 is put to the extremity of the externally threaded part of the spindle 1, and the operating ring 67 is turned by hand in the fastening direction to screw the fastening nut 2 on the externally threaded part of the spindle 1 until the fastening ring 63 comes into contact with the object. The operating ring 67 is turned further by hand and, consequently, the taper ring 60 is moved toward the large end of the tapered outer circumference of the collet 5 by the agency of the ball screw interposed between the operating ring 67 and the taper ring 60 to apply a radial, compressive force to the tapered outer circumference 5e of the collet 5.

Consequently, the collet 5 contracts radially and wedges in the space between the fastening nut 2 and the fastening ring 63 to apply axial forces to the fastening nut 2 and the fastening ring 63. The axial force acting on the fastening nut 2 is born by the spindle 1 and the fastening nut 2 is immovable because the same is combined with the spindle 1 by the threads, whereas the axial force acting on the fastening ring 63 serves as a fastening force for fastening the object to the spindle 1. In FIG. 11C, the taper ring 60 has been shifted to the large end of the tapered outer circumference of the collet 5, and the collet 5 has contracted.

Difference between a rotary object fastening operation for fastening a rotary object, such as a grinding wheel, to the spindle and a stationary object fastening operation for fastening a stationary object to the spindle will be described below.

In the rotary object fastening operation, the operating ring 67 is turned by hand so that the circumferential end on the fastening side of the circumferential groove 67d comes into contact with the stopper 2g attached to the fastening nut 2 before the fastening ring 63 comes into contact with the object. Thus, the fastening ring 63 can be fastened by turning the fastening nut 2 by a turning force applied to the operating ring 67 by hand.

Since the fastening device is supposed to be fastened tighter by an inertial torque, a low manual force is sufficient to fasten the fastening device. When the fastening device is thus fastened, the double-wedge effect is not yet effective.

When the spindle 1 starts rotating after the fastening device as manually been fastened, the fastening nut 2 is screwed further on the externally threaded part of the spindle 1 for extra tightening. Although a force that attempts to increase the outside diameter of the collet 5 acts on the collet 5, the expansion of the collet 5 is inhibited by the taper ring 60. However, a stress corresponding to an extra tightening force is induced in the tapered surface.

In the stationary object fastening operation, the operating ring 67 is turned by hand until the fastening ring 63 comes into contact with the object. The operating ring is turned further by an increased force to force the taper ring 60 to move toward the fastening ring and, consequently, the collet 5 is compressed and the fastening device can be fastened by the double-wedge assisting effect of the first and the second tapered surface of the collet produced by a low manual force.

The circumferential end on the fastening side of the circumferential groove is not engaged with the stopper 2g attached to the fastening nut 2.

An unfastening operation for unfastening the object fastened by the fastening device will be described below.

In a fastened state, large stresses are induced in the corresponding contact surfaces of the fastening nut 2, the fastening ring 63, the collet 5 and the taper ring 60, and these components are restrained from movement relative to each other. When the operating ring 67 is turned in the unfastening direction, the taper ring 60 combined with the fastening nut 2 with respect to a turning direction does not turn and moves axially in an unfastening direction. Consequently, the stress induced in the collet 5 by an extra tightening force decreases gradually as the taper ring 60 moves axially and, eventually, the fastening nut 2 can be easily unfastened by hand.

Figure 12A:
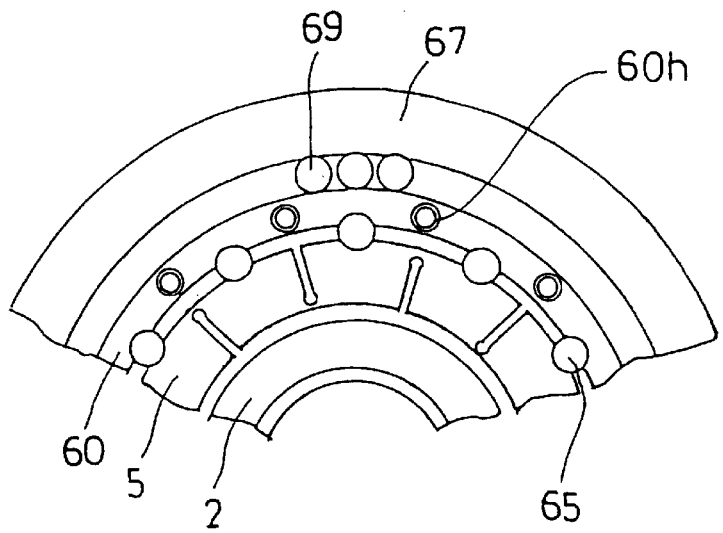
FIGS. 12A, 12B and 12C are a front view, a sectional view in an unfastened state and a sectional view in a fastened state, respectively, of a fastening device in a seventh embodiment of the present invention.
Figure 12B:
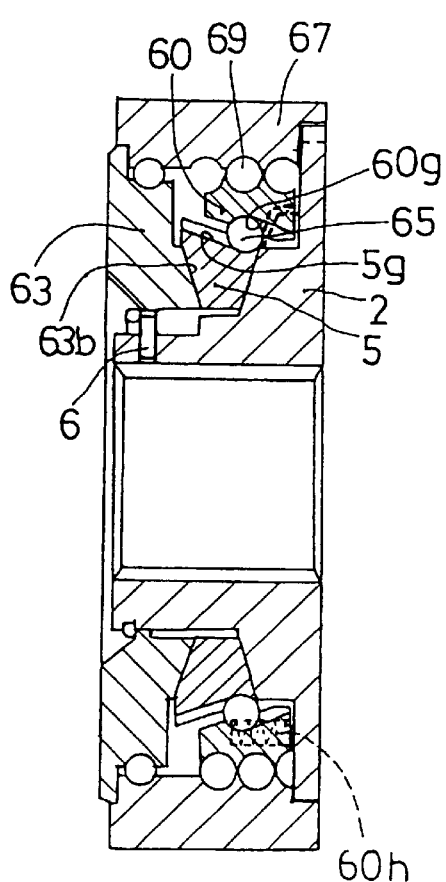
Figure 12C:
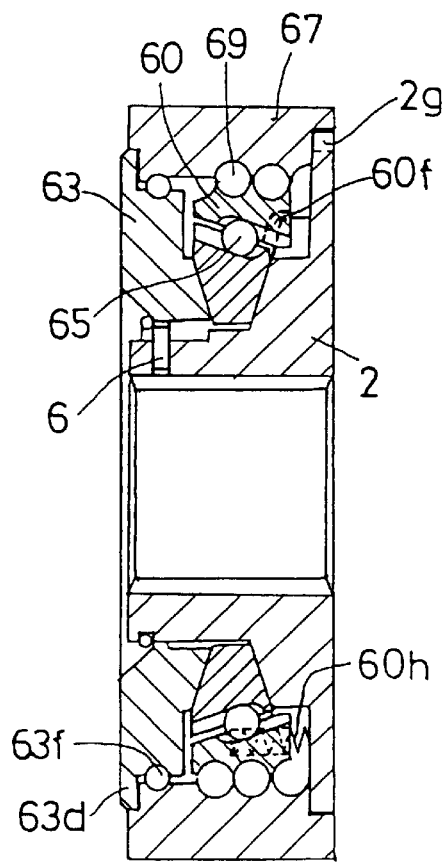

A fastening device in a seventh embodiment of the present invention will be described with reference to FIG. 12A showing the fastening device in a fragmentary front view, FIG. 12B showing the fastening device in an unfastened state in a sectional view, and FIG. 12C showing the fastening device in a fastened state in a sectional view, in which parts like or corresponding to those of the sixth embodiment are designated by the same reference characters and the description thereof will be omitted. The seventh embodiment is substantially the same in construction as the sixth embodiment (FIGS. 11A to 11D), except that a robing friction acts between the outer circumference of a collet 5 and the inner circumference of a taper ring 60 in the seventh embodiment, whereas a sliding friction acts between the corresponding circumferences in the sixth embodiment.

The tapered outer circumference of the collet 5 and the tapered inner circumference of the taper ring 60 are in rolling contact with rolling members 65 interposed between the tapered outer circumference of the collet 5 and the tapered inner circumference of the taper ring 60. Axial grooves 5g are formed at equal angular intervals in the tapered outer circumference of the collet 5, axial grooves 60g are formed at equal angular intervals in the tapered inner circumference of the taper ring 60, and the steel balls 65 are placed in the grooves 5g and 60g and confined between the collet 5 and the taper ring 60.

Since a rolling friction acts on a second tapered surface of a collet structure of the seventh embodiment, a fastening force can be transmitted to a fastening ring by operating an operating ring by a very low force. Therefore, the fastening device in the seventh embodiment is suitable for fastening a stationary object to a spindle.

Although not shown in FIGS. 11A to 11D, the operating ring 67, similarly to that of the second embodiment, is pressed in a fastening direction relative to the fastening nut 2 by springs 10. In FIGS. 12A to 12C, the taper ring 60 is pressed in a fastening direction relative to a fastening nut 2 by springs 60h.

Figure 13A:
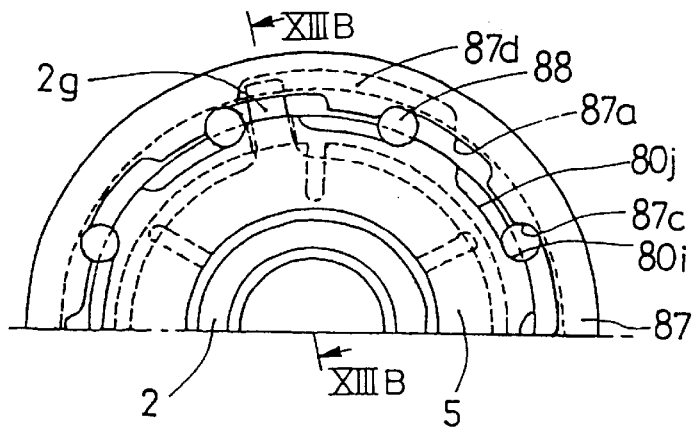
FIG. 13A is a sectional front view of a fastening device in an eighth embodiment of the present invention in an unfastened state.

A fastening device in an eighth embodiment of the present invention will be described with reference to FIGS. 13A to 13E. FIG. 13A is a sectional front view of the fastening device in an unfastened state, FIG. 13B is a sectional view taken on line XIIIB—XIIIB in FIG. 13A, FIG. 13C is a development of the outer circumference of a taper ring when the fastening device is in an unfastened state, FIG. 13D is a front view of the fastening device in a fastened state, and FIG. 13E is a sectional view taken on line XIIIE—XIIIE in FIG. 13D.

The eighth embodiment is characterized in producing a fastening force to be applied to a fastening ring 63 by the movement of rolling members 88 interposed between an operating ring 87 and a taper ring 80.

Figure 13B:
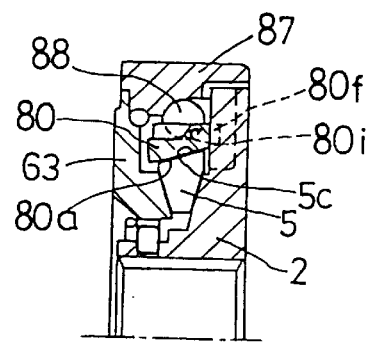
FIG. 13B is a sectional view taken on line XIIIB—XIIIB in FIG. 13A.
Figure 13C:
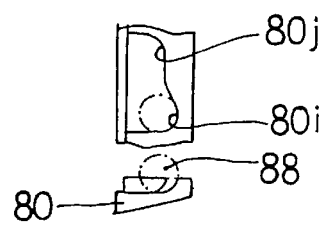
FIG. 13C is a development of the outer circumference of a taper ring when the fastening device is in an unfastened state.
Figure 13D:
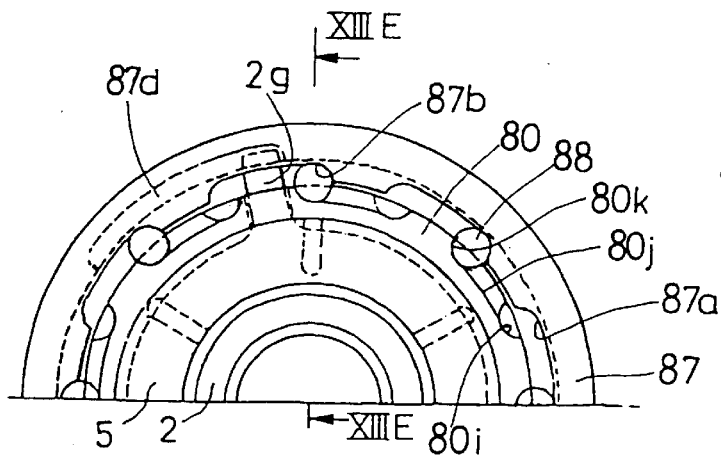
FIG. 13D is a front view of the fastening device in a fastened state.
Figure 13E:
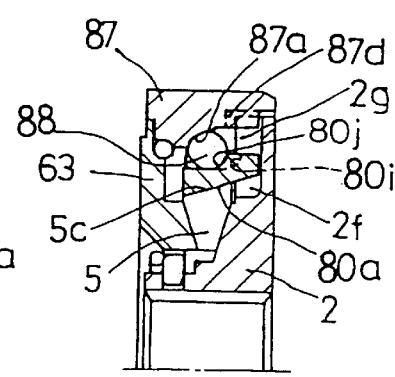
FIG. 13E is a sectional view taken on line XIIIE—XIIIE in FIG. 13D.
Figures 14A, 14B:
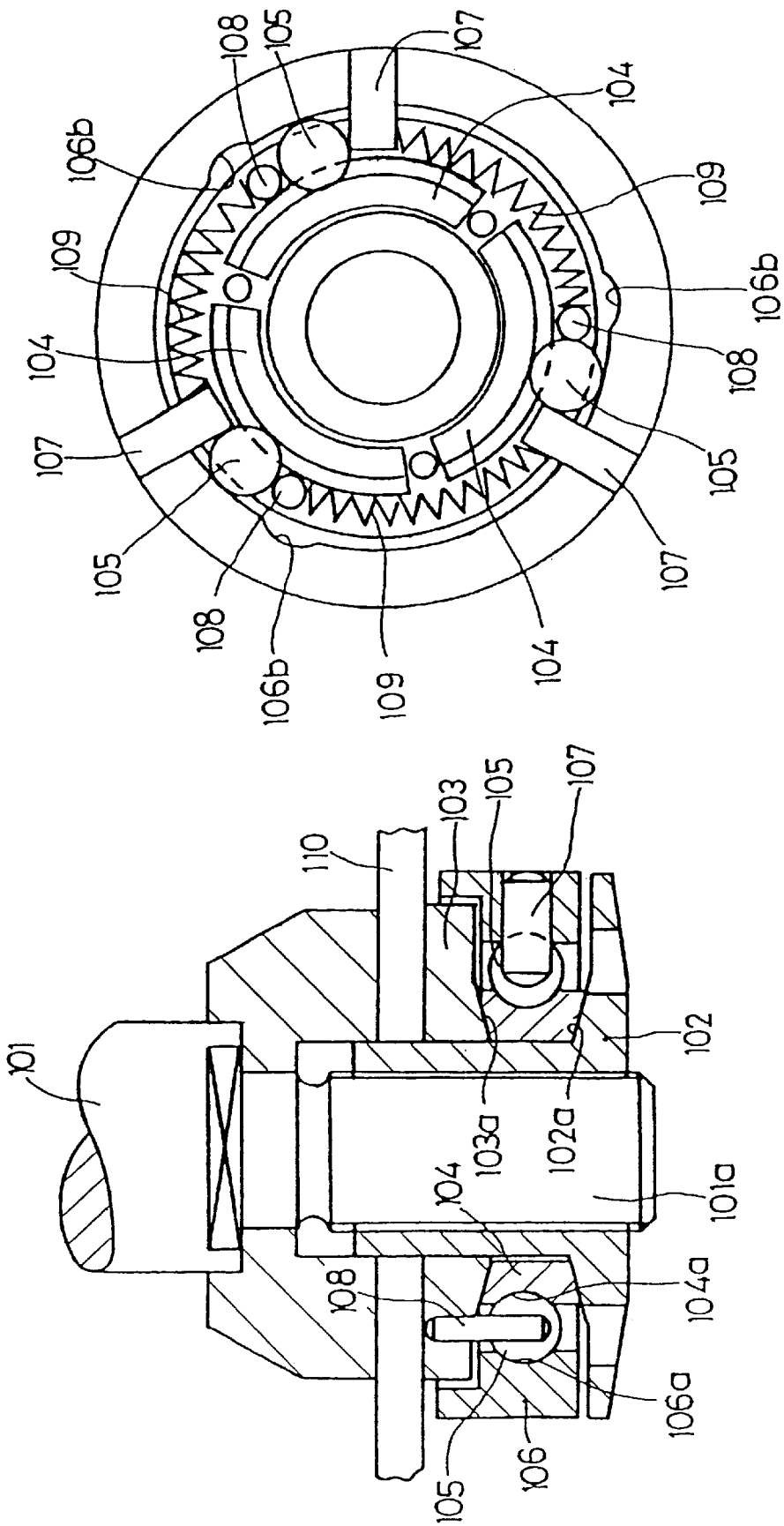
FIGS. 14A and 14B are a sectional front view and a sectional side view, respectively, of a prior art fastening device.

As is obvious from FIGS. 13A and 13B, a fastening nut 2, the fastening ring 63 and a collet 5, similarly to those of the sixth embodiment, constitute a wedging mechanism.

The positional relation between the operating ring 87 and the fastening ring 63, the operative relation between a groove 87d formed in the operating ring 87 to define a range of axial movement of the taper ring 80 and a stopper 2g attached to the fastening nut 2, the positional relation between the fastening nut 2 and the fastening ring 63, and the operative relation between the taper ring 80f and the fastening nut 2 are the same respectively as those in the sixth embodiment.

The eighth embodiment will be described with reference to FIGS. 13A and 13B.

The taper ring 80 is put on the collet 5 with its tapered inner circumference 80a in contact with the tapered outer circumference 5c of the collet 5. Grooves opening on the side of the small end of the tapered inner circumference of the taper ring 80 are formed at equal angular intervals on the cylindrical outer circumference of the taper ring 80. Each groove has a bearing surface 80j of a fixed length having the shape of a quarter of a circle. The bearing surface 80j and a recess 80i are formed in one end opposite the open end of the bearing surface 80j so that a part of a steel ball 88 can be in contact therewith and the taper ring 80 is able to move axially. Bearing surfaces 87a are formed so as to open in a direction opposite the direction in which the bearing surfaces 80j are opened in the inner circumference of an operating ring 87 respectively opposite to the bearing surfaces 80j of the taper ring 80, and the steel balls 88 are confined between the bearing surfaces 80j and 87a to construct a mechanism resembling a thrust bearing.

When the operating ring 87 is turned in an unfastening direction, each of the steel balls 88 remains in a space between the recess 80i of the taper ring 80 and the end surface 87c having the shape of a quarter of a circle of the bearing surface 87a of the operating ring 87. When the operating ring 87 is turned by hand in a fastening direction, each of the steel balls 88 is held between an end surface 80k of the recess 80i of the taper ring 80, and the end having the shape of a quarter of a circle of the bearing surface 87a of the operating ring 87.

Referring to FIG. 13C, a reaction force acts on the saddle-shaped joint of the bearing surface 80j and the recess 80i of the taper ring 80 when the taper ring 80 is moved axially to compress the collet radially. Therefore, the saddle-shaped joint is formed in a smooth, curved surface to enable the operating ring 87 to be easily turned by hand in the fastening direction. Most part of an axial force acting on the taper ring 80 is removed when the steel ball 88 rests in the recess 80i. However, since there still remains a component of a radial force acting on the taper ring 80, the inside diameter of the taper ring 80 and the cone angle of the tapered outer circumference of the collet 5 are determined taking into consideration a frictional force acting between the tapered outer circumference 5c of the collet 5 and the tapered inner circumference 80a of the taper ring 80 to facilitate the movement of the taper ring 80 toward the side of the small end.

It is desirable that the operating ring 87, similarly to those of the third and the fifth embodiment, is pressed in the fastening direction relative to the fastening nut 2 by springs.

The operation of the eighth embodiment will be described with reference to FIGS. 13D and 13E. The steel balls 88 are separated from the end surfaces 87c and shift from the recesses 80i to the bearing surfaces 80j of the taper ring 80, respectively, when the operating ring 87 is turned in the fastening direction. The steel balls 88 are moved from the recesses 80i to the bearing surfaces 80j against a slight resistance that acts on the balls when the balls 88 ride over the joints of the recesses 88i and the corresponding bearing surfaces 80j. Consequently, the collet 5 is compressed by a radial compressive force, the taper ring 80 is shifted toward the fastening nut 2, and the steel balls 88 are confined between the bearing surfaces 87a and 80j. In this state, each steel ball 88 is held between the end having the shape of a quarter of a circle of the bearing surface 87a, and the end having the shape of a quarter of a circle of the taper ring 80 to bear a reaction force produced by the radial compression of the collet 5. A fastening force is transmitted to the fastening ring 63 when each of the steel balls 88 is shifted from the recess 80i to the bearing surface 80j by turning the operating ring 87 by hand. When the operating ring 87 is turned further by hand and each of the steel balls 88 reaches the ends 80k and 87b of the groove, a projection 2e comes into engagement with an end on the fastening side of the groove 87d and the fastening nut 2 is turned thereafter for fastening.

Since the fastening device in the eighth embodiment is intended for fastening a rotating object, the fastening force of the fastening device is enhanced by the extra tightening effect of the rotating object if the operating ring is turned in the fastening direction by hand only to a degree to inhibit the radial expansion of the collet. Therefore, even if the fastening device is fastened by hand and the double-wedge assisting effect is not used, the fastening device is able to exercise a necessary fastening force.

When unfastening the fastening device, the operating ring 87 is turned in the unfastening direction. Then, the steel balls 88 moves along the bearing surfaces 87a and 80j relative to the stationary taper ring 80 to the end surfaces 87c. Upon the drop of the steel balls 88 into the recesses 80i, most part of the axial force acting on the taper ring 80 disappears and the taper ring 80 moves toward the fastening ring 63. At the same time, the radial, compressive force is removed from the collet 5 and the collet 5 restores its outside diameter in a free state and the fastening force applied to the object by the fastening ring 63 is removed.

The taper ring 80, similarly to that employed in the sixth. embodiment, is turned together with the fastening nut 2 by a projection 2f formed on the fastening nut 2. A range of axial movement of the taper ring 80 is determined by the engagement of a stopper 2g attached to the outer circumference of a flange formed on the fastening nut and the groove 87d formed in the operating ring 87. The extra tightening effect of the rotation of the spindle after the fastening device has been fastened by hand is similar to that available in the fastening device in the sixth embodiment. When unfastening the fastening device, the stress induced in the collet by a force exerted on the collet so as to expand the same by the extratightening effect is nullified, and then the operating ring is turned further to unfasten the fastening nut.

This unfastening method is the same as that used for unfastening the rotating object fastened by the sixth embodiment.

In a generally known fastening device, both a fastening force and an unfastening force are transmitted through a single transmission path to the fastening ring. The fastening device of the present invention has two transmission paths. When fastening the fastening device to fasten a rotating object which is expected to produce an extra-tightening effect, a force applied to the operating ring to turn the operating ring is transmitted through the fastening nut to the fastening ring. When unfastening the fastening device, an unfastening force is transmitted through the collet structure to the fastening ring to unfasten the fastening ring.

When the fastening device is operated to fasten and unfasten an ordinary member which is not expected to produce any extratightening effect, a force applied to the operating ring to turn the same is transmitted through the collet structure to the fastening ring both in fastening and in unfastening the fastening device. The double-wedge assisting mechanism of the collet structure enables application of a high fastening force to a fastened object and removal of the fastening force from the fastened object by operating the fastening device by a low force of the fingers without using any special tool.

What is claimed is:

1. A fastening device comprising:

a support member for supporting an object, having an externally threaded part;

a fastening nut capable of being screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

an axial distance between the fastening nut and the fastening ring being increased by reducing a diameter of the collet by applying a radial, compressive force to the collet to move the first tapered surfaces radially inward, the diameter of the collet being capable of being increased by reducing the distance between the fastening nut and the fastening ring by axial pressure of the fastening nut and the fastening ring to move the first tapered surfaces radially outward;

an operating member applying an axial force to the second tapered surface of the collet, wherein the operating member is a taper ring capable of axially moving, and having a working inner circumference acting on the second tapered surface of the collet; and an operating ring fitted on the taper ring to move the taper ring axially relative to the collet, wherein an axial force applied to the taper ring by operating the operating ring is converted into a radial, compressive force acting on the collet by the second tapered surface, the radial, compressive force is converted into an axial force by the first tapered surfaces, and the axial force is transmitted to the fastening ring for fastening or unfastening.

2. A fastening device as claimed in claim 1, further comprising a spring for biasing the taper ring relative to the fastening nut in a tool fastening direction.

3. A fastening device comprising:

a support member for supporting an object, having an externally threaded part;

a fastening nut capable of being screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

an axial distance between the fastening nut and the fastening ring being increased by reducing a diameter of the collet by applying a radial, compressive force to the collet to move the first tapered surfaces radially inward, the diameter of the collet being capable of being increased by reducing the distance between the fastening nut and the fastening ring by axial pressure of the fastening nut and the fastening ring to move the first tapered surfaces radially outward;

an operating member applying an axial force to the second tapered surface of the collet, wherein the operating member is a taper ring capable of axially moving and having a working inner circumference acting on the second tapered surface of the collet; and an operating ring fitted on the taper ring to move the taper ring axially relative to the collet, wherein the taper ring is combined with the fastening nut so as to turn together with the fastening nut, the taper ring is axially movable, the taper ring is moved axially toward a larger end of the second tapered surface of the collet by turning the operating ring when the fastening device fastens the object, the taper ring has a first contact part which comes into contact with a fastening end of the fastening nut after the taper ring has fitted on the second tapered surface to enable the taper ring to turn together with the fastening nut for fastening, and the taper ring has a second contact part which comes into contact with an unfastening end of the fastening nut after the taper ring has moved to a position on a side of a smaller end of the second tapered surface of the collet and a radial, compressive force acting on the collet has been removed to unfasten the object to enable the taper ring to turn together with the fastening nut for unfastening.

4. A fastening device comprising:

a support member for supporting an object, having an externally threaded part;

a fastening nut capable of being screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

an axial distance between the fastening nut and the fastening ring being increased by reducing a diameter of the collet by applying a radial, compressive force to the collet to move the first tapered surfaces radially inward, the diameter of the collet being capable of being increased by reducing the distance between the fastening nut and the fastening ring by axial pressure of the fastening nut and the fastening ring to move the first tapered surfaces radially outward;

an operating member applying an axial force to the second tapered surface of the collet, wherein the operating member is a taper ring capable of axially moving, and having a working inner circumference acting on the second tapered surface of the collet; and an operating ring fitted on the taper ring, wherein the operating ring is provided in an inner circumference with an internal thread, the taper ring is provided in a cylindrical outer circumference with an external thread mating with the internal thread of the operating ring, the operating ring is combined with one of the fastening nut and the fastening ring so as to be turnable and axially immovable, the taper ring is combined with and is turnable together with one of the fastening nut and the fastening ring, the taper ring is axially movable, and the taper ring is moved axially relative to the collet by turning the operating ring for fastening or unfastening.

5. A fastening device comprising:

a support member for supporting an object, having an externally threaded part;

a fastening nut screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

the fastening nut and the fastening ring having therebetween an axial distance that is increased by reducing a diameter of the collet by applying a radial, compressive force to the collet to move the first tapered surfaces radially inward, the collet being increased in diameter by reducing the distance between the fastening nut and the fastening ring by axial pressure produced by the fastening nut and the fastening ring to move the first tapered surfaces radially outward;

a taper ring for applying axial force to the second tapered surface of the collet; and an operating ring fitted on the taper ring to move the taper ring axially relative to the collet, wherein an axial force applied to the taper ring by operating the operating ring is converted into a radial, compressive force acting on the collet via the second tapered surface, the radial, compressive force is converted into an axial force via the first tapered surfaces, and the axial force is transmitted to the fastening ring for fastening or unfastening.

6. A fastening device as claimed in claim 5, further comprising a spring for biasing the taper ring relative to the fastening nut in a tool fastening direction.

7. A fastening device comprising:

a support member for supporting an object, having an externally threaded part;

a fastening nut capable of being screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

an axial distance between the fastening nut and the fastening ring being increased by reducing a diameter of the collet by applying a radial, compressive force to the collet to move the first tapered surfaces radially inward, the diameter of the collet being capable of being increased by reducing the distance between the fastening nut and the fastening ring by axial pressure of the fastening nut and the fastening ring to move the first tapered surfaces radially outward;

an operating member applying an axial force to the second tapered surface of the collet, wherein the operating member is a taper ring capable of axially moving and having a working inner circumference acting on the second tapered surface of the collet; and an operating ring fitted on the taper ring to move the taper ring axially relative to the collet, wherein the taper ring is combined with the fastening ring so as to turn together with the fastening ring, the taper ring is axially movable, the taper ring is moved axially toward a larger end of the second tapered surface of the collet by turning the operating ring when the fastening device fastens the object, the taper ring has a first contact part which comes into contact with a fastening end of the fastening ring after the taper ring has fitted on the second tapered surface to enable the taper ring to turn together with the fastening ring for fastening, and the taper ring has a second contact part which comes into contact with an unfastening end of the fastening ring after the taper ring has moved to a position on a side of a smaller end of the second tapered surface of the collet and a radial, compressive force acting on the collet has been removed to unfasten the object to enable the taper ring to turn together with the fastening ring for unfastening.

8. A fastening device comprising:

a support member for supporting an object, having an externally threaded part;

a fastening nut screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

the fastening nut and the fastening ring having therebetween an axial distance that is increased by reducing a diameter of the collet by applying a radial, compressive force to the collet to move the first tapered surfaces radially inward, the collet being increased in diameter by reducing the distance between the fastening nut and the fastening ring by axial pressure produced by the fastening nut and the fastening ring to move the first tapered surfaces radially outward;

a taper ring for applying axial force to the second tapered surface of the collet; and an operating ring fitted on the taper ring to move the taper ring axially relative to the collet, wherein the taper ring is combined with the fastening nut so as to turn together with the fastening nut, the taper ring is axially movable, the taper ring is moved axially toward a larger end of the second tapered surface of the collet by turning the operating ring when the fastening device fastens the object, the taper ring has a first contact part which comes into contact with a fastening end of the fastening nut after the taper ring has fitted on the second tapered surface to enable the taper ring to turn together with the fastening nut for fastening, and the taper ring has a second contact part which comes into contact with an unfastening end of the fastening nut after the taper ring has moved to a position on a side of a smaller end of the second tapered surface of the collet and a radial, compressive force acting on the collet has been removed to unfasten the object to enable the taper ring to turn together with the fastening nut for unfastening.

9. A fastening device comprising:

a support member for supporting an object, having an externally threaded part;

a fastening nut screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

the fastening nut and the fastening ring having therebetween an axial distance that is increased by reducing a diameter of the collet by applying a radial, compressive force to the collet to move the first tapered surfaces radially inward, the collet being increased in diameter by reducing the distance between the fastening nut and the fastening ring by axial pressure produced by the fastening nut and the fastening ring to move the first tapered surfaces radially outward;

a taper ring for applying axial force to the second tapered surface of the collet; and an operating ring fitted on the taper ring to move the taper ring axially relative to the collet, wherein the taper ring is combined with the fastening ring so as to turn together with the fastening ring, the taper ring is axially movable, the taper ring is moved axially toward a larger end of the second tapered surface of the collet by turning the operating ring when the fastening device fastens the object, the taper ring has a first contact part which comes into contact with a fastening end of the fastening ring after the taper ring has fitted on the second tapered surface to enable the taper ring to turn together with the fastening ring for fastening, and the taper ring has a second contact part which comes into contact with an unfastening end of the fastening ring after the taper ring has moved to a position on a side of a smaller end of the second tapered surface of the collet and a radial, compressive force acting on the collet has been removed to unfasten the object to enable the taper ring to turn together with the fastening ring for unfastening.

10. A fastening device comprising:

a support member for supporting an object, having an externally threaded part;

a fastening nut screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

the fastening nut and the fastening ring having therebetween an axial distance that is increased by reducing a diameter of the collet by applying a radial, compressive force to the collet to move the first tapered surfaces radially inward, the collet being increased in diameter by reducing the distance between the fastening nut and the fastening ring by axial pressure produced by the fastening nut and the fastening ring to move the first tapered surfaces radially outward;

a taper ring for applying axial force to the second tapered surface of the collet; and an operating ring fitted on the taper ring, wherein the operating ring is provided in an inner circumference with an internal thread, the taper ring is provided in a cylindrical outer circumference with an external thread mating with the internal thread of the operating ring, the operating ring is combined with one of the fastening nut and the fastening ring so as to be turnable and axially immovable, the taper ring is combined with and is turnable together with one of the fastening nut and the fastening ring, the taper ring is axially movable, and the taper ring is moved axially relative to the collet by turning the operating ring for fastening or unfastening.

11. A fastening device comprising:

a support member for supporting an object, having an externally threaded part;

a fastening nut screwed on the externally threaded part;

a fastening ring fitted on the fastening nut coaxially with the fastening nut and interposed between the fastening nut and the object supported on the support member, said fastening ring being axially movable relative to the fastening nut to press the object in a direction in which the fastening nut advances when the fastening nut is screwed on the externally threaded part of the support member;

the fastening nut and the fastening ring having axially opposite end surfaces, respectively, the end surfaces having a V-shaped cross section and serving as support surfaces;

an annular collet being interposed between the support surfaces;

the collet having side surfaces formed as first tapered surfaces subject to an action of the support surfaces, and an outer circumference formed as a second tapered surface for converting an axial force applied to the collet into a radial force;

the fastening nut and the fastening ring having therebetween an axial distance that is increased by reducing a diameter of the collet by applying a radial, compressive force to the collet to move the first tapered surfaces radially inward, the collet being increased in diameter by reducing the distance between the fastening nut and the fastening ring by axial pressure produced by the fastening nut and the fastening ring to move the first tapered surfaces radially outward;

a taper ring for applying axial force to the second tapered surface of the collet; and an operating ring disposed around the fastening nut and the fastening ring in a circumferentially rotatable manner, the operating ring being combined with the taper ring so that rotation of the operating ring causes axial movement of the taper ring relative to the collet.

12. A fastening device as claimed in claim 11, wherein the operating ring is supported on the fastening ring.

13. A fastening device as claimed in claim 11, wherein the operating ring is in screw engagement with the taper ring.

14. A fastening device as claimed in claim 13, wherein the taper ring is in engagement with the fastening nut, whereby the taper ring rotates when the fastening nut is turned.

15. A fastening device as claimed in claim 13, wherein the taper ring is engaged with the fastening nut through a groove-and-projection engagement.

16. A fastening device as claimed in claim 11, wherein the operating ring is in ball-screw engagement with the taper ring.

17. A fastening devise as claimed in claim 16, wherein the taper ring is in engagement with the fastening nut, whereby the taper ring rotates when the fastening nut is turned.

18. A fastening device as claimed in claim 16, wherein the taper ring is engaged with the fastening nut through a groove-and-projection engagement.

19. A fastening device as claimed in claim 11, wherein the taper ring is in engagement with the fastening nut, whereby the taper ring rotates when the fastening nut is turned.

20. A fastening device as claimed in claim 11, wherein the taper ring is engaged with the fastening nut through a groove-and-projection engagement.

* * * * *